US010236678B2

(12) United States Patent
Bonasia et al.

(10) Patent No.: US 10,236,678 B2
(45) Date of Patent: Mar. 19, 2019

(54) REINSTALLABLE CIRCUIT INTERRUPTING DEVICE WITH VIBRATION RESISTANT MISWIRE PROTECTION

(71) Applicant: Hubbell Incorporated, Shelton, CT (US)

(72) Inventors: Gaetano Bonasia, Bronx, NY (US); Stephen P. Simonin, Northfield, CT (US); Kenny Padro, Hamden, CT (US); Tom Batko, Wallingford, CT (US)

(73) Assignee: Hubbell Incorporated, Shelton, CT (US)

( * ) Notice: Subject to any disclaimer, the term of this patent is extended or adjusted under 35 U.S.C. 154(b) by 610 days.

(21) Appl. No.: 14/867,846

(22) Filed: Sep. 28, 2015

(65) Prior Publication Data
US 2016/0020597 A1    Jan. 21, 2016

Related U.S. Application Data

(62) Division of application No. 13/422,793, filed on Mar. 16, 2012, now Pat. No. 9,147,548.

(51) Int. Cl.
| | |
|---|---|
| *H02H 3/00* | (2006.01) |
| *H02H 9/08* | (2006.01) |
| *H02H 3/33* | (2006.01) |
| *H01H 83/04* | (2006.01) |
| *H01H 83/14* | (2006.01) |
| *H01H 50/14* | (2006.01) |
| *H01H 50/32* | (2006.01) |
| *H02H 3/16* | (2006.01) |
| *H02H 3/26* | (2006.01) |

(52) U.S. Cl.
CPC ............ *H02H 3/335* (2013.01); *H01H 50/14* (2013.01); *H01H 50/32* (2013.01); *H01H 83/04* (2013.01); *H01H 83/144* (2013.01); *H02H 3/16* (2013.01); *H02H 3/26* (2013.01); *H02H 3/33* (2013.01); *H01H 2235/01* (2013.01)

(58) Field of Classification Search
CPC ............ H02H 3/335; H02H 3/02; H02H 3/33; H02H 3/20; H02H 3/347; H01H 50/32; H01H 83/04; H01H 83/144
USPC .................................. 361/42, 44, 45, 49, 50
See application file for complete search history.

(56) References Cited

U.S. PATENT DOCUMENTS

| | | |
|---|---|---|
| 6,040,967 A | 3/2000 | DiSalvo |
| 6,381,112 B1 | 4/2002 | DiSalvo |
| 6,580,344 B2 | 6/2003 | Li |

(Continued)

*Primary Examiner* — Rexford Barnie
*Assistant Examiner* — Rasem Mourad
(74) *Attorney, Agent, or Firm* — Michael Best & Friedrich, LLP

(57) ABSTRACT

A GFCI includes a latch assembly provided with a rigid electrically conducting bar connected thereto such that when a user presses a reset button the latch assembly is moved toward a pair of contacts provided as part of a reset circuit to initiate a reset operation. When the electrically conducting bar on the latch assembly connects the pair of contacts, the reset circuit is closed and an actuator is activated to place the GFCI device in the latched, reset, condition. If the GFCI device is correctly wired, the latch assembly enters the latched state. If the device is not properly wired no power is provided to the actuator and the device remains in the tripped, or open, state.

19 Claims, 25 Drawing Sheets

(56) References Cited

U.S. PATENT DOCUMENTS

| | | |
|---|---|---|
| 6,657,834 B2 | 12/2003 | DiSalvo |
| 6,828,886 B2 | 12/2004 | Germain et al. |
| 6,867,954 B2 | 3/2005 | Wu et al. |
| 6,930,574 B2 | 8/2005 | Gao |
| 6,975,492 B2 | 12/2005 | DiSalvo |
| 6,994,585 B2 * | 2/2006 | Benoit ............... H01R 25/003 174/58 |
| 7,009,473 B2 | 3/2006 | Zhang |
| 7,019,952 B2 | 3/2006 | Huang et al. |
| 7,034,224 B2 | 4/2006 | Kim et al. |
| 7,209,330 B2 | 4/2007 | DiSalvo |
| 7,271,987 B1 | 9/2007 | Zhang et al. |
| 7,307,821 B2 | 12/2007 | Wang |
| 7,355,497 B2 | 4/2008 | Germain et al. |
| 7,411,766 B1 * | 8/2008 | Huang ................ H01H 71/04 335/13 |
| 7,414,499 B2 | 8/2008 | Germain |
| 7,498,909 B2 | 3/2009 | Zhang et al. |
| 7,538,944 B2 | 5/2009 | Bonilla et al. |
| 7,554,781 B1 | 6/2009 | Weeks et al. |
| 7,633,726 B2 | 12/2009 | Huang et al. |
| 7,643,257 B1 | 1/2010 | Morgan et al. |
| 7,701,680 B2 * | 4/2010 | Li ........................ H01H 83/04 361/42 |
| 7,940,498 B2 * | 5/2011 | Huang ................ H01H 83/04 200/43.11 |
| 8,102,226 B2 | 1/2012 | Weeks et al. |
| 2004/0037018 A1 * | 2/2004 | Kim ................... H01R 13/7135 361/42 |
| 2008/0002314 A1 * | 1/2008 | Batko ..................... H02H 3/04 361/42 |
| 2008/0024944 A1 * | 1/2008 | Gouhl ................ H01H 83/04 361/42 |
| 2009/0147417 A1 | 6/2009 | Goodsell et al. |
| 2009/0284880 A1 * | 11/2009 | Radosavljevic ....... H01H 71/20 361/45 |
| 2011/0216453 A1 * | 9/2011 | Haines .................... H02H 9/00 361/49 |
| 2012/0154972 A1 * | 6/2012 | McMahon ............ H01H 47/22 361/187 |

\* cited by examiner

REINSTALLABLE CIRCUIT INTERRUPTING DEVICE WITH VIBRATION RESISTANT MISWIRE PROTECTION

CROSS-REFERENCE TO RELATED APPLICATIONS

This application is a divisional of U.S. patent application Ser. No. 13/422,793 filed Mar. 16, 2012, the entire content of which is hereby incorporated herein by reference.

BACKGROUND OF THE INVENTION

Field of the Invention

The present application relates generally to circuit interrupting devices, such as ground fault circuit interrupting (GFCI) devices, that prevent power from being delivered to a connected load when the circuit interrupting device is not properly wired. More particularly, the present application is directed to a latching mechanism provided in a GFCI device that will not enter a latched, "reset," state connecting a line contact with a load contact unless the GFCI device is properly installed with AC power connected to the line terminals of the device.

Description of Related Art

GFCI devices are designed to trip in response to the detection of a ground fault condition at an AC load. Generally, the ground fault condition results when a person comes into contact with the line side of the AC load and earth ground at the same time, a situation that can potentially result in serious injury or death. The GFCI device recognizes this condition by using a sensing transformer to detect an imbalance between the electric currents flowing in the hot and neutral conductors of the AC supply, as will occur when some of the load current is being diverted to ground. When such an imbalance is detected, an actuator, such as a solenoid or a relay, activates a latched circuit breaker mechanism within the GFCI device to enter a tripped state, thereby opening one or both sides of the AC line, i.e., hot and/or neutral, removing power to the load.

GFCI devices may be connected, for example, to fuse boxes or circuit panels, but more commonly, conventional GFCI devices are incorporated into electrical receptacles and installed at various locations within a building. Similar to regular electrical receptacle outlets these conventional GFCI devices have a set of conductive receptacle terminals that are accessible through slots in the face of the GFCI device. In many GFCI devices these face terminals are connected directly to the load terminals which are electrically connected to the line terminals when the latching mechanism is in a closed, or reset, condition. When the device is properly wired the AC power source is connected to the line terminals of the GFCI device and downstream load devices, such as additional GFCI devices or regular, non-GFCI, receptacles, are electrically connected to the load terminals.

If the GFCI device is "reverse wired," also referred to as "miswired," where the AC power source is connected to the load terminals instead of the line terminals, a potentially dangerous situation arises. That is, according to some conventional GFCI devices, when the load terminals are connected to an AC power source, and the receptacle, or face, terminals are electrically connected to the load terminals, the receptacle terminals are always powered, even if the circuit breaker, or latching mechanism, is not latched. As a result, the installer, and possibly the user, would be under the mistaken impression that the GFCI is operating correctly. The installer or user would be unaware that the GFCI is not providing fault protection, even when a fault condition is detected and the device trips, as expected. That is, if the device trips, for example in response to a real or test ground fault, power is still supplied to the face terminals and any device plugged into the face terminals. This is because AC power is directly connected to the load terminals which, in many older devices, are electrically connected to the face terminals.

To prevent such a potentially dangerous situation, Underwriters Laboratories (UL) Standard 943 requires that GFCI devices have a means to detect such miswiring conditions, and prevent power from being supplied to the face terminals in such instances. Thus, in accordance with UL standards, any attempt to reset a miswired GFCI device should prevent power from being provided to the face terminals. A solution employed by some manufacturers is to provide the GFCI to the installer in a tripped condition where the latch mechanism is in an open, unlatched, state such that no power is provided to the face terminals. The latch mechanism is then permitted to enter a closed, reset, state only if the device is properly wired. These types of GFCI devices typically utilize a mechanical locking mechanism that prevents the device from being reset until a properly wired condition is detected, at which point the locking feature is disabled. The locking feature of these GFCI devices is typically permanently disabled after the device is properly installed. Thus, according to these devices miswiring protection is only provided at the time of initial installation. This solution is particularly undesirable because the GFCI device no longer provides miswiring protection when the GFCI device is removed and/or re-installed later.

Another undesirable characteristic of such devices is the propensity for the mechanical locking feature to malfunction due to something happening to the device prior to the first installation. Known causes of such malfunction include the device being subjected to strong vibrations or shock during shipping, for example, resulting from the device being dropped, or otherwise exposing the GFCI device to an impact. In this case, the face terminals will provide unprotected power unbeknownst to the user if the GFCI device is miswired.

Further, it is known that even though manufacturers typically advise customers and the public to test their GFCI devices periodically by pressing the "TEST" button on the device, causing an intentional imbalance in the hot and neutral currents in the device, the devices are rarely tested as advised. Accordingly, some manufacturers have provided so-called "self-test" mechanisms within their GFCI devices for automatically testing the device without requiring human intervention. Conventional self-test GFCI devices, however, fail to test the device in a robust fashion where many of the device components are tested and false failures are ignored.

Thus, it is desirable to provide a GFCI device that includes shock and/or drop proof miswiring protection, which is re-installable after the device has been removed or power has been cut-off from the device and which optionally provides a robust self-testing feature for automatically testing the functionality of the device without human intervention.

SUMMARY OF THE INVENTION

Exemplary embodiments of the present invention address at least the above problems and/or disadvantages and provide at least the advantages described below. Accordingly, an aspect of exemplary embodiments of the present invention is to provide a ground fault circuit interrupting (GFCI) device having a reset device including a reset button and a cylindrical reset pin, the reset pin having a flange portion and being movable in a first direction along its cylindrical axis, a latch block with an opening therethrough, wherein the reset pin passes freely through the opening in the latch block and the latch block is movable in the first direction. A latch plate is further provided in the GFCI device that has a flat portion with an aperture therethrough and an end portion substantially perpendicular to the flat portion, the latch plate being movable in a second direction transverse to the first direction. The exemplary GFCI device further includes a reset circuit with a pair of electrical contacts and a rigid electrically conductive member fixed to a first surface of the latch block, the rigid electrically conductive member contacting the pair of electrical contacts and completing the reset circuit to initiate a reset function when the reset button is pressed.

A further embodiment of the invention includes a circuit interrupting device comprising a pair of line conducting members including at least a hot line conducting member and a neutral line conducting member, a pair of load conducting members including at least a hot load conducting member and a neutral load conducting member, a pair of face conducting members including at least a face conducting member and a neutral face conducting member, and a detection circuit configured to generate a detection signal upon detecting a current imbalance in at least one of the pairs of line, load and face conducting members. A circuit interrupting device in accordance with this exemplary embodiment further includes a latch assembly engaged with one or more of the line, load and face conducting members and for electrically connecting the line, load and face conducting members to place the circuit interrupting device in a reset state and electrically isolate the line, load and face conducting members to place said circuit interrupting device in a tripped state. An activation circuit is also provided in accordance with this embodiment, the activation circuit is electrically connected to the detection circuit and the latch assembly and configured to activate the latch assembly upon receiving the detection signal from the detection circuit. Also, a reset assembly is provided including a reset circuit and a reset mechanism, the reset circuit having a first electrical contact electrically connected to the detection circuit and a second electrical contact connected to the activation circuit, wherein the activation circuit is activated when the first and second electrical contacts of the reset circuit are electrically connected.

A further embodiment of the invention includes a method of operation for a GFCI device. The method includes connecting AC power to line terminals of the GFCI device, pressing a reset button of the GFCI device in a first direction, the reset button being attached to a reset pin, pushing a latch plate in the first direction with a flange portion of the reset pin, and pushing a latch block in the first direction with the latch plate, the latch block having a rigid conducting member attached to a bottom surface of the latch block. According to this method the following additional steps are also conducted, electrically connecting two auxiliary contacts of a reset circuit with the rigid conducting member, activating an actuator when the auxiliary contacts are electrically connected, moving the latch plate with the actuator in a direction transverse to the first direction when the actuator is activated, aligning a first aperture in the latch block with a second aperture in the latch plate, moving the latch plate with a first resilient member in a direction opposite the first direction when the first and second apertures are aligned, wherein the flange portion of the reset pin passes through the second aperture of the latch plate, deactivating the actuator, moving the latch plate with a second resilient member in a direction opposite the second direction when the actuator is deactivated, and pulling the latch block with the should portion of the reset pin in the direction opposite the first direction. If AC power is not properly connected to the line terminals, the actuation cannot be activated and, thus, the device will not be placed into the reset condition. That is, the latch block will never ultimately be pulled up where the line, load and face contacts will be electrically connected.

A further embodiment of the invention includes a circuit interrupting device having a hot line terminal and a neutral line terminal for electrically connecting to an AC power source, a hot load terminal and a neutral load terminal for electrically connecting to an electrical load, a first electrical conductor disposed between the hot line terminal and the hot load terminal, a second electrical conductor disposed between the neutral line terminal and the neutral load terminal, a fault detecting circuit operable to detect at least one type of fault and generate a fault detection signal when the fault is detected, an interrupter electrically connected to the first and second conductors and the hot and neutral load terminals and being operable to electrically disconnect one or more of the hot line terminal from the hot load terminal and the neutral line terminal from the neutral load terminal when actuated, a first switching device electrically coupled to the fault detecting circuit and closing when the fault detection signal is received from the fault detecting circuit, a second switching device electrically coupled to an output of the first switching device and closing as a result of the first switching device closing, and a third switching device electrically coupled to an output of the first switching device and closing as a result of the first switching device closing, wherein the interrupter is actuated when at least one of the second and third switching devices is closed.

A still further embodiment of the invention includes a circuit interrupting device with a housing having a front cover and a rear cover, a hot line terminal and a neutral line terminal for electrically connecting to an AC power source, a hot load terminal and a neutral load terminal for electrically connecting to an electrical load, a first electrical conductor disposed between the hot line terminal and the hot load terminal, a second electrical conductor disposed between the neutral line terminal and the neutral load terminal, a detecting circuit operable to detect a magnetic flux and generate a detection signal when the flux is detected, an interrupter electrically connected to the first and second conductors and the hot and neutral load terminals and operable to electrically disconnect one or more of the hot load terminal from the hot line terminal and the neutral load terminal from the neutral line terminal when actuated, and an auto-monitoring circuit electrically coupled to the detecting circuit and operable to generate a test magnetic flux to be detected by the detecting circuit, wherein the rear cover of the housing includes a recessed receptacle in which the hot line terminal and the neutral line terminal are disposed, the recessed receptacle being configured to receive a power plug connected to AC power.

Objects, advantages and salient features of the invention will become apparent to those skilled in the art from the following detailed description, which, taken in conjunction with annexed drawings, discloses exemplary embodiments of the invention.

BRIEF DESCRIPTION OF THE DRAWINGS

The above and other exemplary features and advantages of certain exemplary embodiments of the present invention will become more apparent from the following description of certain exemplary embodiments thereof when taken in conjunction with the accompanying drawings in which.

Throughout the drawings, like reference numerals should be understood to refer to like elements, features and structures.

DETAILED DESCRIPTION OF EXEMPLARY EMBODIMENTS

The matters exemplified in this description are provided to assist in a comprehensive understanding of exemplary embodiments of the present invention disclosed with reference to the accompanying figures. Those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

Figure 1A:
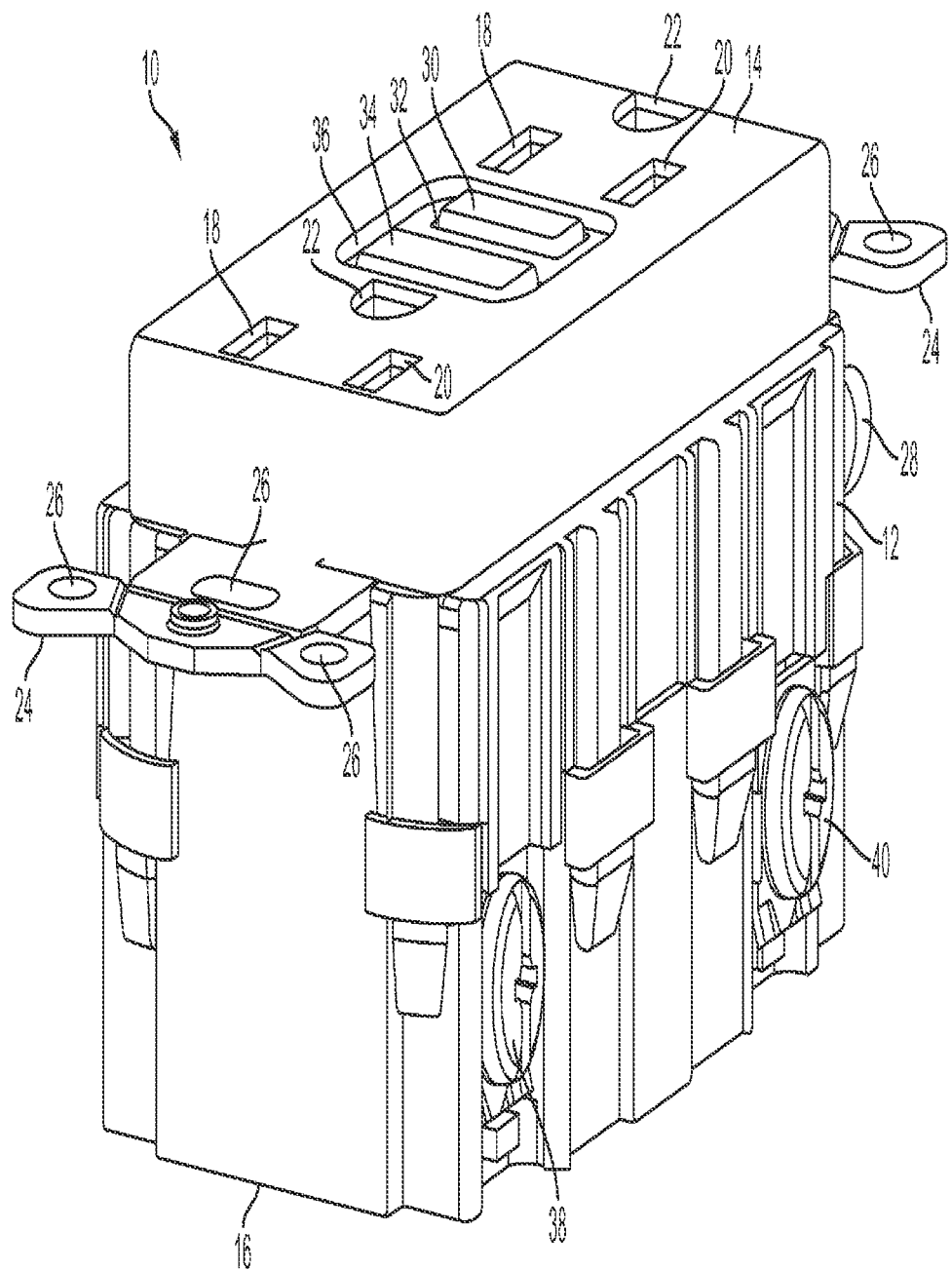
FIG. 1A is a top perspective view of a ground fault circuit interrupting (GFCI) device in accordance with an exemplary embodiment of the present invention.

FIG. 1A is a perspective view of an exemplary ground fault circuit interrupting (GFCI) receptacle device 10 in accordance with an embodiment of the present invention. The GFCI device 10 includes a housing 12 having a cover portion 14 and a rear portion 16. GFCI 10 also includes an inner housing (see, for example, FIG. 4) visible when the cover portion 14 is removed from the rear portion 16. Cover portion 14 and rear portion 16 are removably secured to each other via fastening means such as clips, screws, brackets, tabs and the like. Because the embodiment shown in FIG. 1A is a duplex receptacle device, cover portion 14 includes two pair of plugin slots 18 and 20 (also referred to as face receptacles) and two grounding slots 22. It will be appreciated by those skilled in the art that plugin slots 18 and 20 and grounding slots 22 can accommodate polarized, non-polarized, grounded or non-grounded blades of a male plug. The male plug can be a two-wire or three-wire plug without departing from the scope of the present invention. GFCI receptacle 10 further includes ground strap 24 having mounting holes 26 for mounting GFCI receptacle 10 to a junction box (not shown). Grounding screw 28 for connecting to a ground conductor is disposed at the rear wall of housing 12.

Figure 2A:
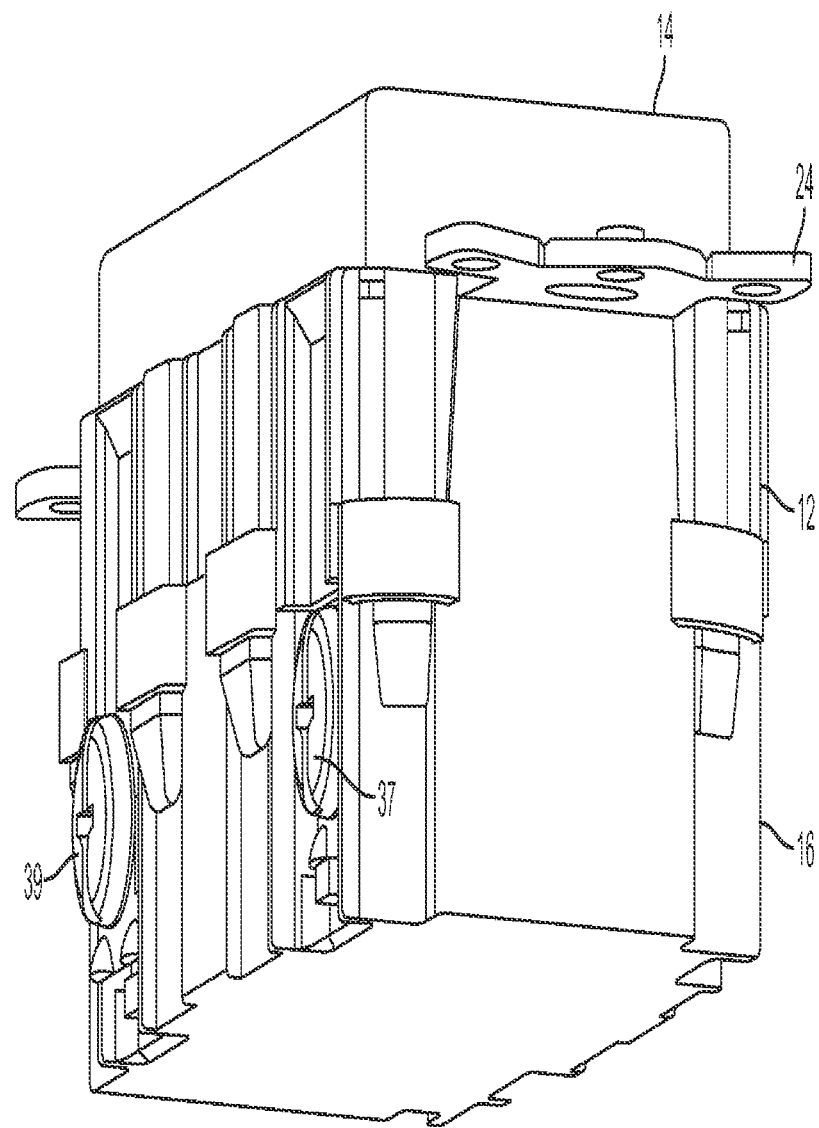
FIG. 2A is a bottom perspective view of the ground fault circuit interrupting device shown in FIG. 1A.

Rear portion 16 includes four terminal screws, 37-40, of which only screws 38 and 40 are shown in FIG. 1A. When the GFCI device is properly installed, load side terminal screw 38 is connected to a load side neutral conductor and an opposing load side terminal screw 37 (See FIG. 2A) is connected to a load side hot conductor. Line side terminal screw 40 is connected to the neutral conductor of a power supply, and an opposing line terminal screw 39 (See FIG. 2A) is connected to the hot conductor of the power supply. It will be appreciated by those skilled in the art that GFCI receptacle 10 can also include apertures proximate the line and load terminal screws 37-40 to receive the bare end of the conducting wires rather than connecting the bare end of the wires to the line and load terminal screws.

Still referring to FIG. 1A, test button 30 extends through opening 32 in cover portion 14 of housing 12. Depressing the test button activates a test operation that tests the circuit interrupting components disposed in GFCI receptacle 10. The circuit interrupting components, to be described in detail below, are used to break electrical continuity in one or more conductive paths between the line and load sides of the GFCI receptacle 10, and the user-accessible face terminals, by transitioning a latching mechanism to enter an unlatched, or "tripped," state. Reset button 34 extends through opening 36 in cover portion 14 of housing 12. Depressing reset button 34 activates a reset operation to place the latching mechanism in a latched, or "reset," state that reestablishes electrical continuity in the open conductive paths, that is, it reestablishes electrical continuity between the line, load and face contacts.

Figure 1B:
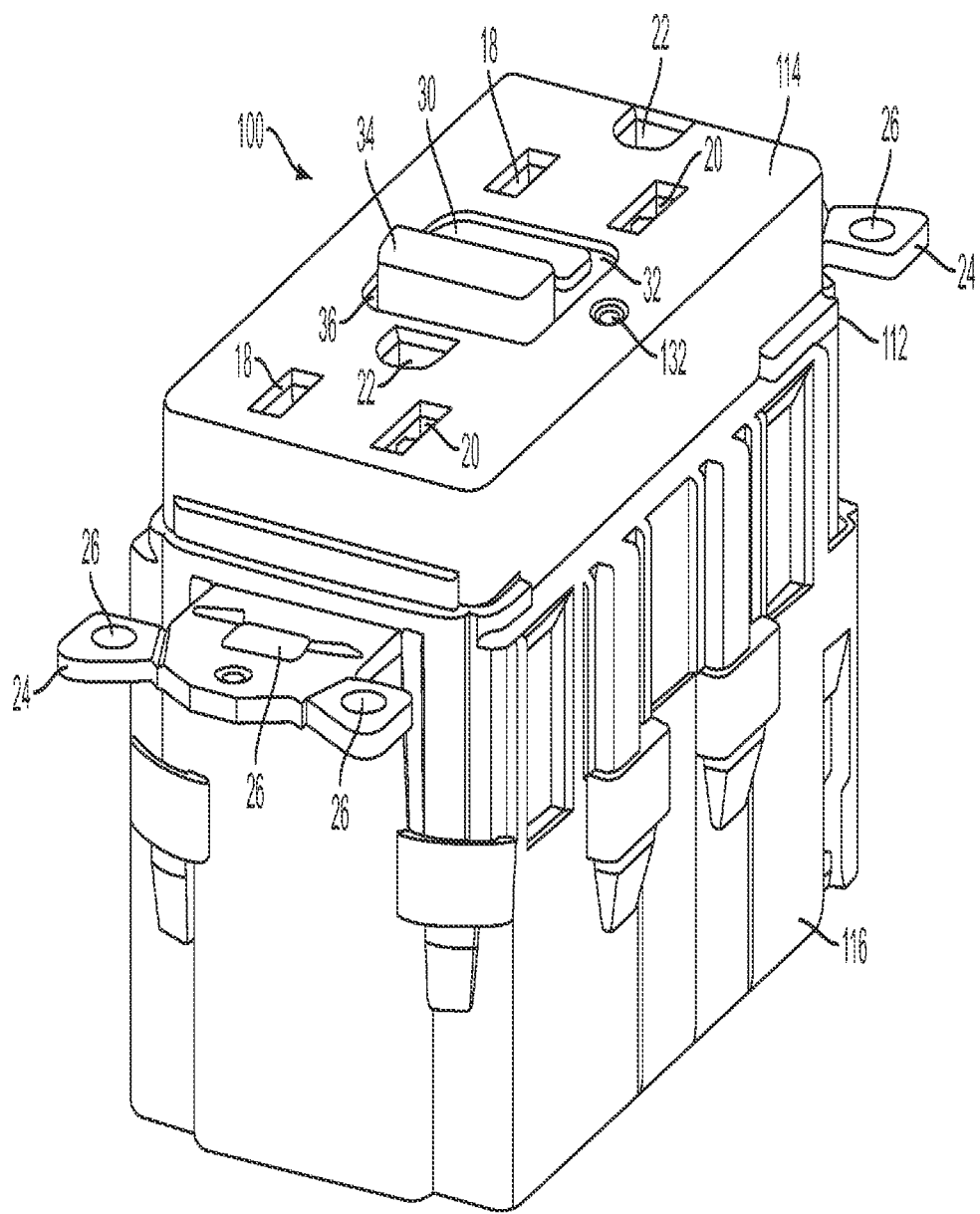
FIG. 1B is a top perspective view of a ground fault circuit interrupting (GFCI) device in accordance with a second exemplary embodiment of the present invention.
Figure 2B:
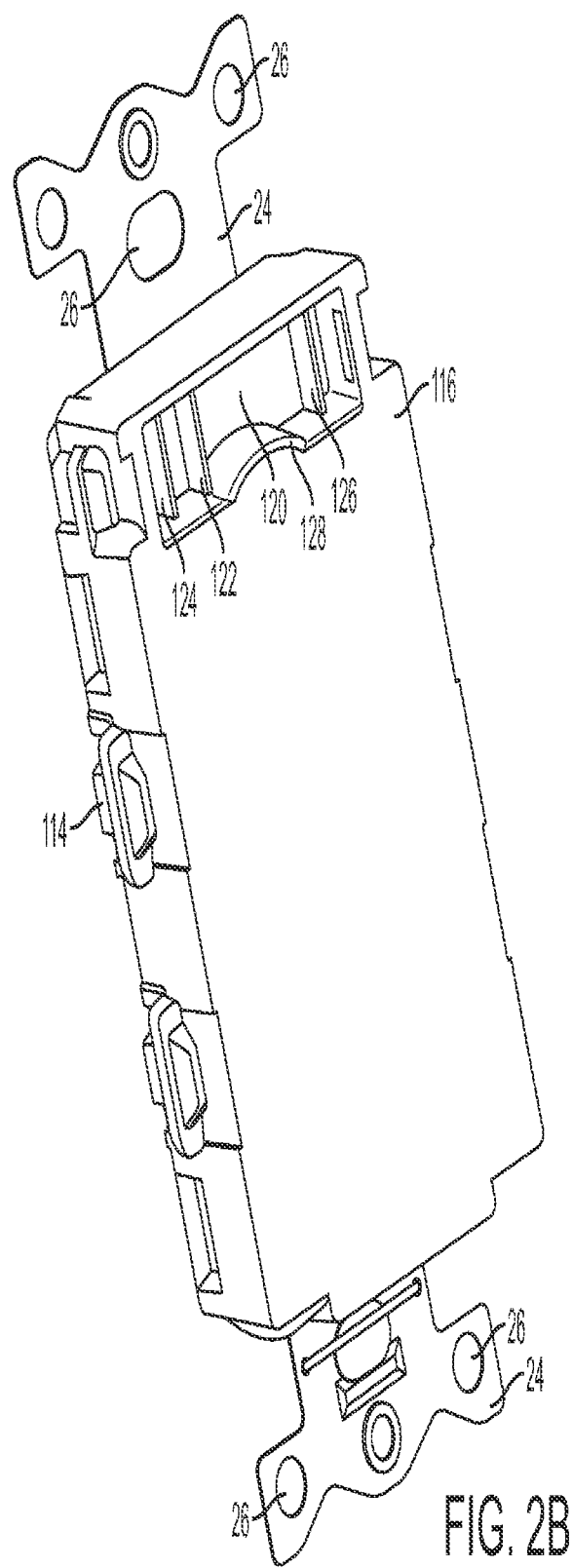
FIG. 2B is a bottom perspective view of the ground fault circuit interrupting device shown in FIG. 2A.

FIG. 1B depicts a further exemplary embodiment of a GFCI receptacle device in accordance with the invention. In particular, GFCI 100 is similar to GFCI 10 in FIG. 1A in some respects, but GFCI device 100 has several important differences. Housing 112 includes cover portion 114 and rear portion 116. Similar to GFCI 10, cover portion 114 includes two pair of plugin slots 18 and 20 and two grounding slots 22. GFCI device 100 further includes ground strap 24 having mounting holes 26 for mounting the GFCI receptacle 100 to a junction box (not shown). GFCI 100 does not include terminal screws 37-40, as shown in FIG. 1A, because GFCI 100 is connected to AC power via a plug-in terminal on the back of rear cover 116, as shown in FIG. 2B. Also, cover portion 114 of GFCI 100 includes a visible indicator 132, such as an LED, to indicate the status of one or more conditions of the device, which are described in more detail below.

Referring to FIG. 2B, rear cover 116 includes an input power receptacle 120. Input power receptacle 120 connects with a "keyed," i.e., having a corresponding shape to input receptacle 120, input power connector (not shown) which provides AC power to the device. Input receptacle 120 includes male ground blade 122, male neutral blade 124 and male hot blade 126. Blade 126 connects to the hot, or phase, side of the input power connector, blade 124 connects to the neutral side of the input connector and ground blade 122 connects to the ground connection of the input connector. In comparison to GFCI device 10 shown in FIG. 1A, GFCI 100, thus, provides a convenient mechanism by which AC power is applied to the device, i.e., by way of the input connector. Further, because of the shape of input receptacle 120, for example, as provided by curved portion 128, the input connector can only be inserted into receptacle 120 if it is correctly oriented. That is, a curved portion on the input connector must be similarly shaped and aligned with curved portion 128 on receptacle 120 before the connector can be inserted into the receptacle. Accordingly, it is virtually impossible to miswire the device. Specifically, because the input connector can only be inserted into the input receptacle one way, the hot conductor in the input connector cannot be connected to the neutral or ground conductors of the input receptacle, and vice versa.

Figure 3A:
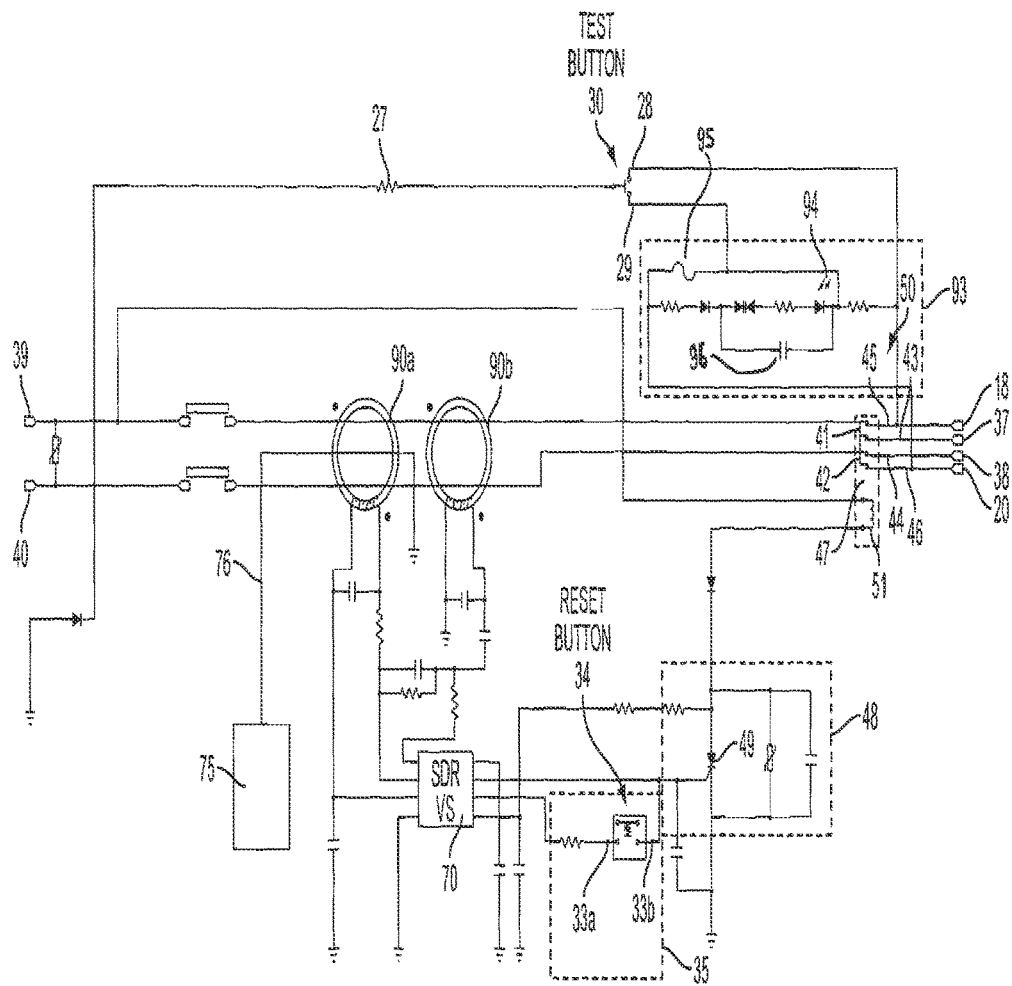
FIG. 3A is a schematic diagram of an exemplary electric circuit of the ground fault circuit interrupting device of FIG. 1A.

FIG. 3A is an electrical schematic diagram illustrating circuit interrupting components of an exemplary GFCI device in accordance with the invention. The circuit depicted in FIG. 3A is consistent with and can be implemented as part of either GFCI 10 or GFCI 100 shown respectively in FIGS. 1A and 1B. For ease of description here, however, the circuit of FIG. 3A is described in connection with GFCI 10, as shown in FIG. 1A. In accordance with this embodiment, the circuit interrupting components of GFCI device 10 include test button 30, reset button 34, which is provided as part of reset circuit 35, latch assembly 50, firing circuit 48, sensing transformer 90A, ground transformer 90B, and a GFCI chip 70. GFCI chip 70 according to this embodiment is a commercially available GFCI device, such as, an RV4141 or RV4145 by Fairchild™.

Latch assembly 50 includes contact assembly 47 and solenoid 51. Further, contact assembly 47, an exemplary embodiment of which is shown more clearly in FIGS. 11A and 11B, includes a plurality of contact pairs, 41-42, 43-44, 45-46, electrically connected to line terminals, screws, (39, 40), load terminals, screws, (37, 38) and face terminals (18, 20), respectively. When latch assembly 50 is in the latched state, the hot line, hot load and hot face contacts (41, 43, 45, respectively) are electrically connected together, and the neutral line, neutral load and neutral face contacts (42, 44, 46, respectively) are electrically connected together. Thus, when the device is latched in the reset state and AC power is applied to the device, power is also provided to the load and face terminals.

Firing circuit 48 includes a silicon controlled rectifier (SCR) 49 that functions as a switch to control current flow through solenoid 51, as described further below. The electrical components depicted in FIG. 3A and described above, are preferably interconnected on a printed circuit board (PCB).

Figure 3B:
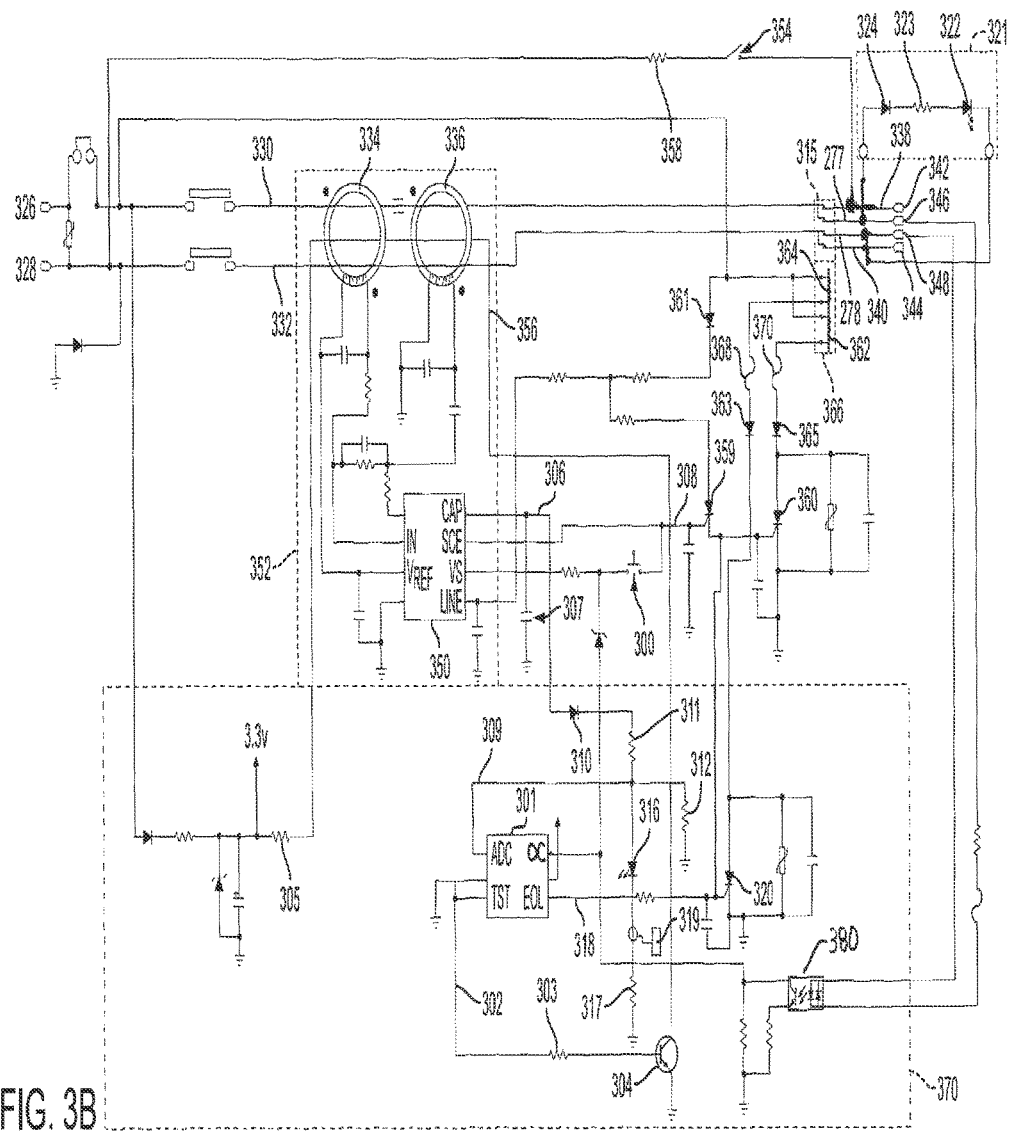
FIG. 3B is a schematic diagram of an exemplary electric circuit of the ground fault circuit interrupting device of FIG. 2A.

The components of GFCI devices 10 and 100, as illustrated in FIGS. 3A and 3B, are structured and arranged to prevent miswiring of the GFCI device during installation. For example, prior to installation of GFCI device 10, latch assembly 50 is provided in an unlatched state such that the line, load and face contacts of contact assembly 47 are not electrically connected. In this unlatched state, the power supply is cut-off from the face terminals, 18, 20, as well as from any other loads connected downstream from the GFCI via load terminals 37, 38. Power is provided to face terminals, 18, 20, only if the power supply is properly connected to the line side terminals 39, 40 and the device is in the latched state. To initiate a latched, "reset", state of the latch assembly 50, a user presses the reset button 34 to electrically connect secondary contacts 33a and 33b provided on the PCB and close reset circuit 35.

Figure 4:
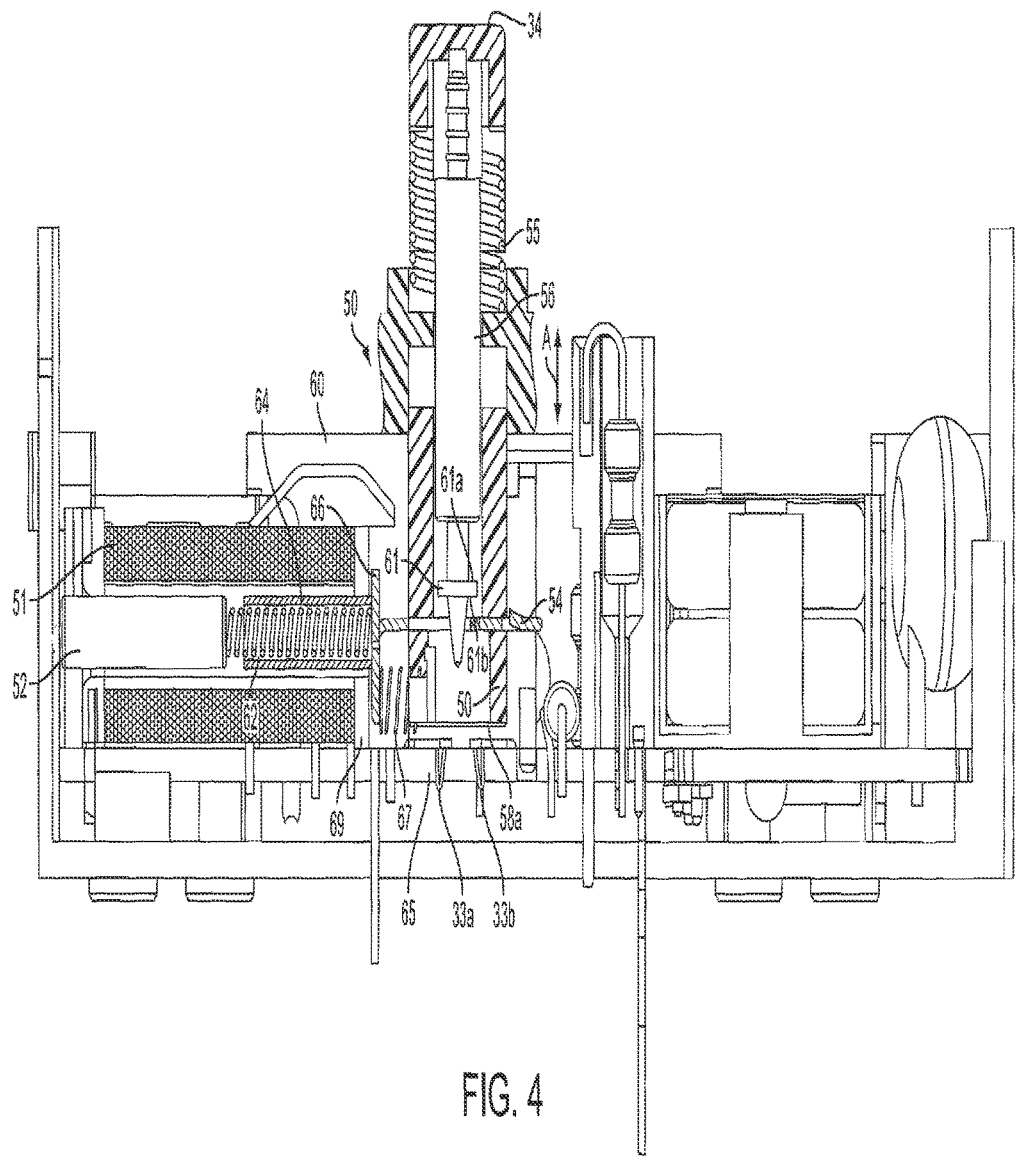
FIG. 4 is a cross sectional view illustrating the various mechanical components within the ground fault circuit interrupting device of FIG. 1 in accordance with an exemplary embodiment of the present invention.

When reset circuit 35 is closed, the gate of SCR 49 is energized by GFCI IC device 70 and if GFCI 10 is correctly wired to the live power source current flows through SCR 49. That is, GFCI IC device 70 is only powered and able to gate SCR 49 when AC power is connected to the line side terminals, 39, 40. When SCR 49 is ON, i.e., its gate is activated, it passes current drawn from the hot line terminal 39 through solenoid 51 to electrical ground. As described in greater detail below with respect to FIGS. 6-10, a plunger provided within the coil of solenoid 51 is forced, due to a magnetic field generated around the coil, to move in a predetermined direction moving a latch plate 54 (FIG. 4). Latch plate 54 moves to a position such that upon release of the reset button, the latch assembly 50 enters the latched state to connect the contacts of the contact assembly, as shown in FIG. 10C.

If GFCI device 10 is miswired, and AC power is connected to load terminals 37, 38, upon the user pressing reset button 34, SCR 49 will not turn ON because GFCI IC device 70 will be unable to provide a voltage on the gate of SCR 49. Accordingly, no current will be drawn through solenoid 51 to enable the latch assembly 50 to enter the latched state and the device will remain in the tripped state.

The exemplary circuit of FIG. 3A also includes optional microprocessor 75 with electrical conductor 76 connected between microprocessor 75 and ground. Conductor 76 traverses through transformer 90A and conducts current through the transformer when microprocessor 75 outputs a test signal on conductor 76. Further information regarding the operation and configuration of microprocessor 75 is provided in, for example, U.S. Pat. No. 7,443,309, the entire contents of which are incorporated herein by reference.

FIG. 3B is an electrical schematic of a circuit in accordance with a further embodiment of the invention. Specifically, FIG. 3B depicts a circuit for a self-testing embodiment in accordance with the present invention. It is noted that the circuit shown in FIG. 3B is consistent with and can be implemented in either of GFCI device 10 or GFCI 100. Also, the electro-mechanical aspects of the operation of a GFCI device utilizing the circuit of FIG. 3B are consistent with the description of the operations provided below with respect to FIGS. 4-7 and 9-13. For simplicity and ease of discussion, however, the operational description with respect to these figures is provided below in reference to the GFCI device 10 shown in FIGS. 1A and 2A and the circuit shown in FIG. 3A. Specific additional details related to the circuit of FIG. 3B are provided subsequently.

FIG. 4 depicts a cross-section of internal housing 13 according to exemplary GFCI device 10. In FIG. 4, cover portion 14 (FIG. 1A) of housing 12 has been removed to expose internal housing 13. Internal housing 13 includes latch assembly 50 which includes "T"-shaped latch plate 54. Latch plate 54 slidably extends through the latch assembly 50, as shown, and is secured to latch assembly 50 such that they move together during both the latching and tripping sequences, in the directions shown by the arrow "A". Reset pin 56 is provided through a central opening in latch assembly 50 with reset button 34 provided at the end of the reset pin extending out of the central opening 36 in the GFCI cover 14 (FIG. 1A). Reset pin 56 has an annular reset flange 61 extending radially outwardly from reset pin 56 and having first upwardly facing surface 61a and second downwardly facing surface 61b near the end of the reset pin 56 opposite the reset button 34 at the upper end. As discussed further below, first and second surfaces 61a, 61b engage with lower and upper surfaces, respectively, of the latch plate 54 to initiate a reset operation and to position the latch plate 54 in the latched state. Reset pin 56 is surrounded by a helical spring element 55 provided between the reset button 34 and a support surface in the latch assembly 50. In the tripped position, reset button 34 is urged upward in FIG. 4 by spring element 55.

Figure 6A:
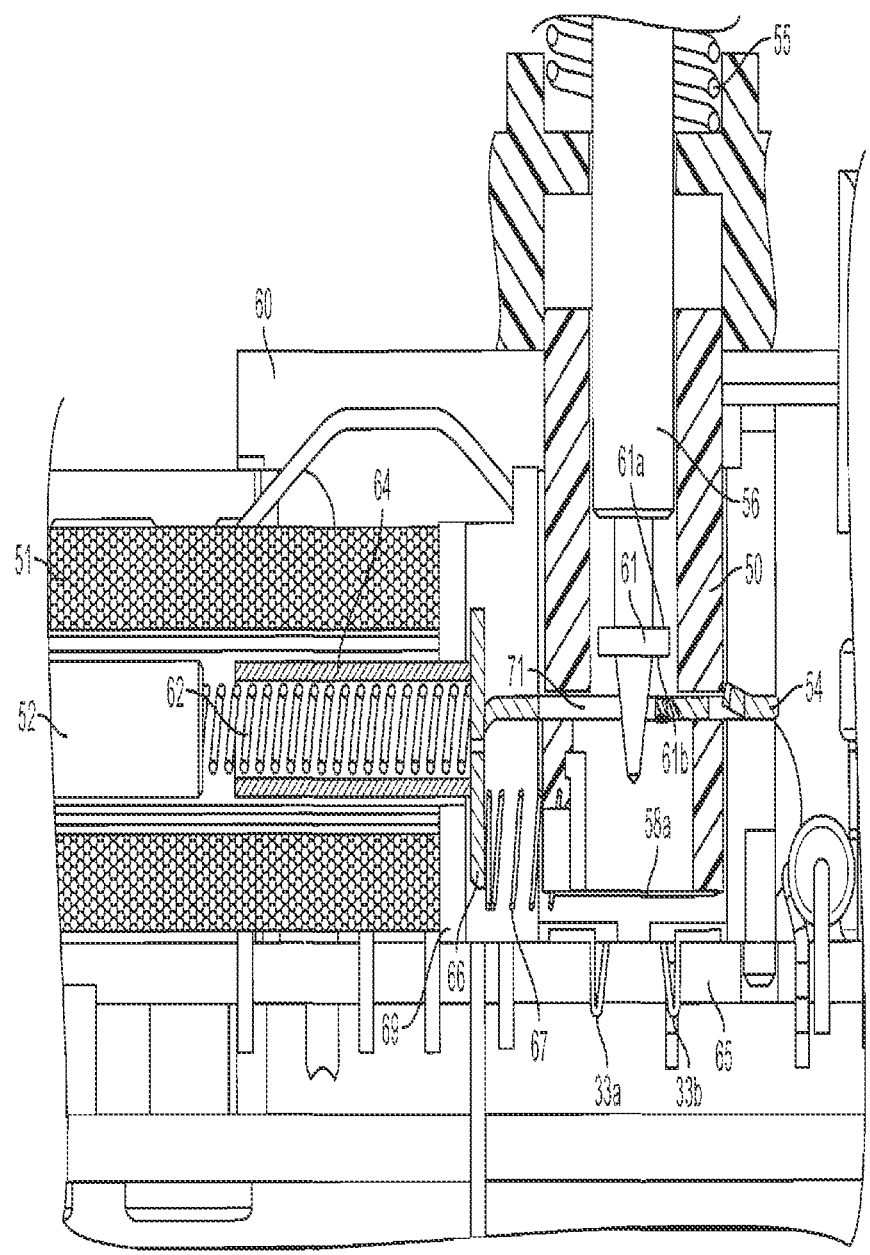
FIG. 6A is an enlarged cross sectional view of a portion of the latch assembly and reset mechanism in the tripped condition, within the solenoid housing of the ground fault circuit interrupting device of FIG. 1 in accordance with an embodiment of the present invention.

A conductive shorting bar 58a, more easily seen in FIG. 6A, is provided at a lower end of the latch assembly 50 on a surface facing the printed circuit board (PCB) 65. Secondary switch contacts 33a and 33b are provided on PCB 65 at a position facing shorting bar 58a. Shorting bar 58a is preferably a rigid member composed of a conducting material, such as metal, and has a length at least equal to the distance between the secondary contacts 33a and 33b provided as part of the reset circuit 35 (FIG. 3A). Shorting bar 58a is electrically isolated from secondary switch contacts 33a and 33b at all times, except during the user initiated reset operation. Specifically, latch assembly 50 is suspended above PCB 65 to prevent shorting bar 58a from contacting the secondary switch contacts and, thus, shorting the reset circuit except when a user presses reset button 34 to initiate the reset operation.

In a further embodiment, shorting bar 58a is attached to the latch assembly 50 with one or more intervening spring elements to provide additional travel for the latch assembly. For example, in accordance with this further embodiment one or more springs, such as coil springs, leaf springs, etc., are placed between the bottom of latch assembly 50 and shorting bar 58a. When reset button 34 is pressed, spring element 55 begins to compress as shorting bar 58a moves downward toward secondary switch contacts 33a, 33b. When shorting bar 58a makes contact with switch contacts 33a, 33b, the spring element(s) between the shorting bar and the bottom of the latch assembly begin to compress as reset button 34 continues to be pressed and reset spring 55 continues to compress.

Solenoid 51 is provided within solenoid housing 60. Plunger 52, spring element 62 and spacer 64 are all provided within solenoid 51 and are coaxially therewith. As shown, plunger 52 and spring element 62 abut against an outer surface of side wall 66 of the "T"-shaped latch plate 54. Latch plate 54 is held in its initial position by the force of helical spring element 67 provided between an inner surface of side wall 66 and a lower end of the latch assembly 50. In the absence of a magnetic field around solenoid 51, the force of spring element 67 overcomes the force of spring element 62 provided within solenoid 51, side wall 66 of latch plate 54 remains pressed against flange 69 of the solenoid housing.

Figure 5A:
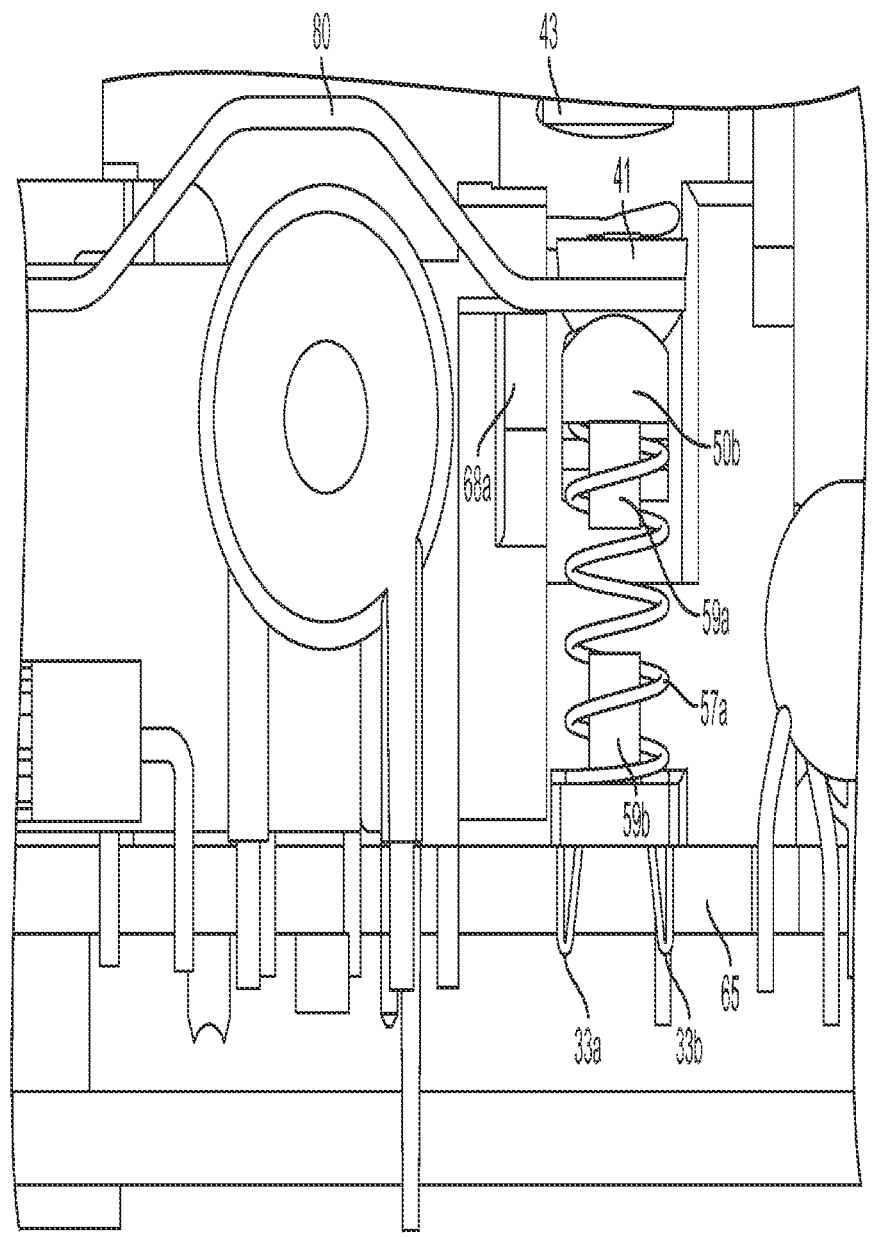
FIG. 5A is an enlarged cross sectional side view of a portion of the latch assembly and spring mechanism within the solenoid housing of the ground fault circuit interrupting device of FIG. 1 in accordance with an embodiment of the present invention.
Figure 5B:
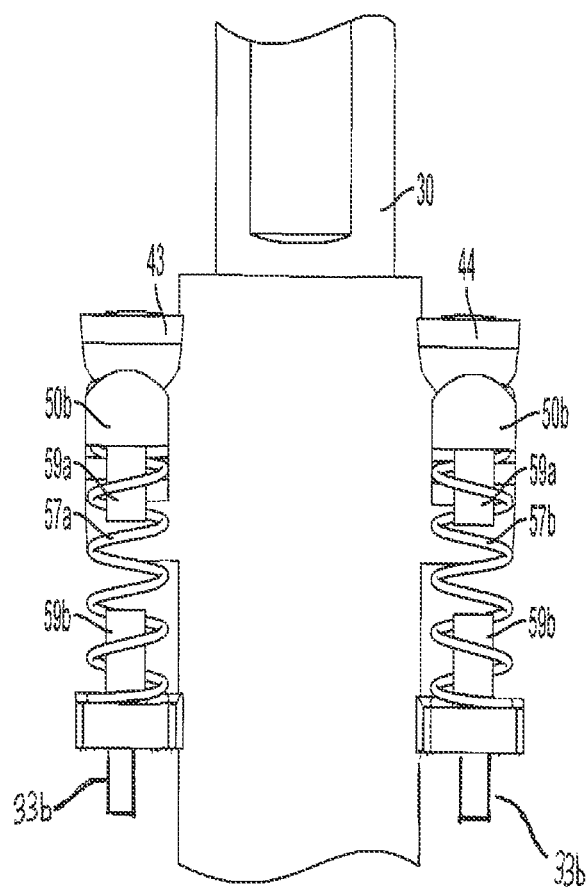
FIG. 5B is an enlarged cross sectional front view of a portion of the latch assembly and spring mechanism within the solenoid housing of the ground fault circuit interrupting device of FIG. 5A in accordance with an embodiment of the present invention.

FIGS. 5A, 5B are enlarged side and front cross-sectional views, respectively, of an exemplary embodiment of latch assembly 50. As shown, latch assembly 50 is suspended above the PCB 65 by spring elements 57a and 57b provided between the two pairs of retaining pegs 59a and 59b. According to this embodiment, retaining pegs 59b are provided as part of the solenoid housing 60, while retaining pegs 59a are provided as part of the latch assembly 50, as shown. Retaining pegs 59a are provided on the outwardly protruding surfaces or arms 50b integral with and extending laterally away from the latch assembly 50. Retaining pegs 59a and 59b not only retain the spring elements 57a and 57b but they also provide reactive surfaces for the spring elements 57a and 57b, to keep the latch assembly 50 floating or suspended above PCB 65. The force provided by spring elements 57a and 57b is sufficient to maintain the latch assembly 50 in the floating position in the absence of an external force, for example when a user presses the reset button to begin the reset operation.

As described in greater detail below with respect to FIGS. 11A, 11B, when GFCI device 10 enters the latched state, laterally extending arms 50b of latch assembly 50 urge cantilevered load contact arms 80 and 81 into engagement with cantilevered line contact arms 82 and 83, respectively, to supply power to the face and load terminals. Because load contact arms 80 and 81 electrically connect with line contact arms 82 and 83, respectively, in the latched state, load contact arms 80 and 81 are preferably formed as resilient cantilevers that are effectively biased toward PCB 65, away from line contact arms 82 and 83. To prevent cantilevered load arms 80 and 81 from undesirably forcing the latch assembly arms 50b, and, thus, the latch assembly 50, against the bias of the spring elements 57a and 57b toward the PCB 65 in the unlatched state, solenoid housing 60 also preferably includes at least one fixed or built-in stop 68a providing a stop surface against which the cantilevered load arms 80 and 81 rest, thus, stopping further downward movement. Fixed stop 68a prevents the cantilevered arms from providing a force on the latch assembly arms 50b, by blocking movement of the cantilevered arms in the biased direction when the cantilevered arms contact the fixed stop. Fixed stop 68a is provided as an additional means to ensure that the latch assembly 50 remains suspended above PCB 65 in the absence of an applied force by a user to initiate the reset mechanism. A similar fixed stop 68b is also preferably provided on the opposite side of solenoid housing 60 to provide a similar stop surface for the cantilevered line arms 82 and 83. Fixed stop 68b prevents a dangerous situation from occurring where the cantilevered line arms 82 and 83 may be urged by the effective bias of the cantilever to contact the load arms 80 and 81, while the GFCI is in an unlatched state.

FIGS. 6-10 are perspective views illustrating the sequence of operation of the latching mechanism of the exemplary GFCI device 10 as it enters the latched, "reset," state. As illustrated in FIG. 6A, according to this exemplary embodiment the GFCI device is in the unlatched, or "tripped," condition. This is the condition the device is in when it is provided from the manufacturer. As shown, latch assembly 50 in the initial unlatched state is suspended above the printed circuit board (PCB) 65, such that there is no physical contact between shorting bar 58a and secondary PCB contacts 33a and 33b. In the unlatched state, latch plate 54 is positioned below the contact flange of the reset pin formed by first and second contact surfaces 61a, 61b of reset flange 61. In this unlatched position, as described further below with respect to FIG. 11A, line side contacts 41 and 42 are not able to contact load side contacts 43 and 44, respectively, thus preventing power from being supplied to any load side devices or face terminals 18, 20 (FIG. 1) of the GFCI device. Thus, in the initial state, prior to the reset operation, there is no power supplied to face terminals 18, 20 regardless of whether or not the GFCI device is correctly wired to a power source.

Figure 6B:
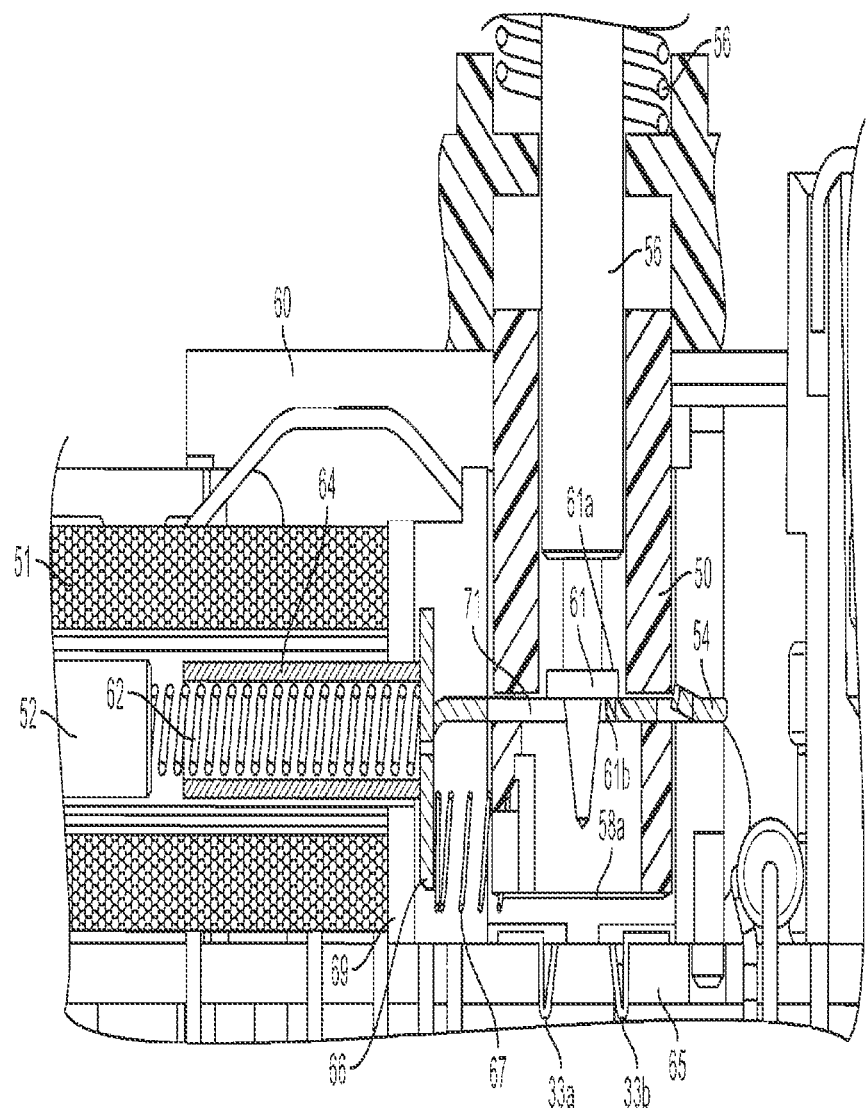
FIG. 6B is an enlarged cross sectional view of a portion of the latch assembly and reset mechanism within the solenoid housing of the ground fault circuit interrupting device of FIG. 1 as the reset button is initially being pressed, in accordance with an embodiment of the present invention.

After the GFCI device is correctly wired to a power source by connecting the hot and neutral conductors of the power source to the line terminals 39 and 40, respectively, a reset operation is performed before power will be supplied to the face terminals 18, 20 and load terminals 37, 38. To initiate a reset, i.e., to place the latch assembly in a latched state, a user presses the reset button 34 protruding from GFCI cover 14 against the force of the spring element 55 surrounding reset pin 56. Reset pin 56 moves in the same direction as reset button 34 into the GFCI housing toward latch plate 54. As shown in FIG. 6B, bottom surface 61b of reset flange 61 contacts latch plate 54. Prior to contacting latch plate 54, reset pin 56, including reset flange 61, moves axially through a hole in the body of latch assembly 50 without effecting movement of the latch assembly. Due to the engagement with the latch plate 54, which is movable in the same direction with the latch assembly 50, and upon continued pressing of reset button 34, latch assembly 50 moves against the force of spring elements 57a, 57b, shown in FIG. 5B, together with the reset pin 56.

Figure 7A:
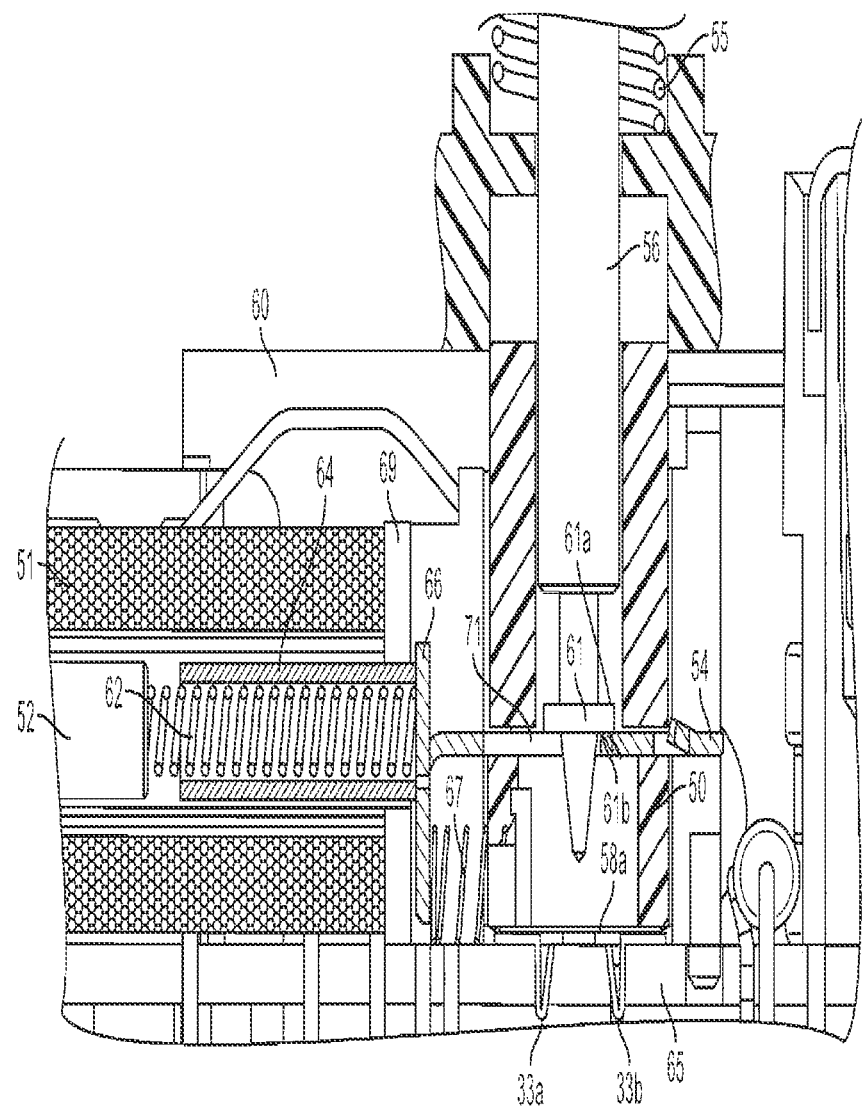
FIG. 7A is an enlarged cross sectional view of a portion of the latch assembly and reset mechanism within the solenoid housing of the ground fault circuit interrupting device of FIG. 1 when the reset button is fully pressed and the switch on the PCB is closed, in accordance with an embodiment of the present invention.
Figure 7B:
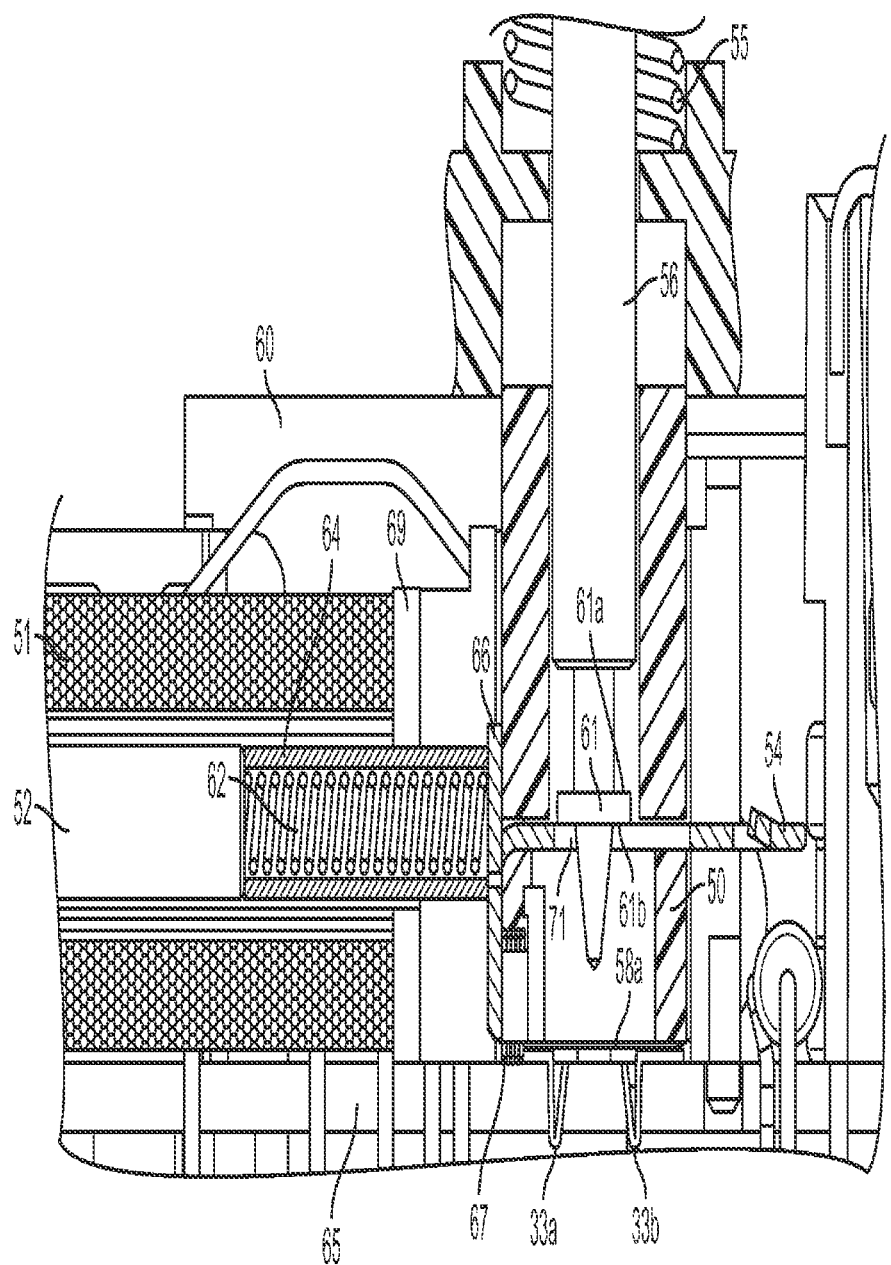
FIG. 7B is an enlarged cross sectional view of a portion of the latch assembly and reset mechanism within the solenoid housing of the ground fault circuit interrupting device of FIG. 1 after the solenoid has fired.

As shown in FIGS. 7A, 7B, downward movement of latch assembly 50 and latch plate 54 continues until shorting bar 58a comes into contact with secondary contacts 33a, 33b provided on PCB 65, thus closing the reset switch (34 in FIG. 3A, 300 in FIG. 3B). Secondary contacts 33a, 33b, provided on PCB 65, form a first part of the reset switch. When shorting bar 58a contacts secondary contacts 33a, 33b, the reset switch is closed, thus, providing a conductive path between the gate of SCR 49 (FIG. 3A) and the voltage output pin of the microcontroller 70. If GFCI device 10 is wired correctly, an electric current will be supplied to the gate terminal of SCR 49 through this closed conductive path. The supplied current transitions SCR 49 into a conducting/operating state and current is drawn through solenoid 51 from the correctly wired hot line terminal 39. The current now flowing generates a magnetic field at solenoid 51 that forces, i.e., fires, plunger 52 in a direction that slightly compresses spring 62 against the side wall 66 and pushes spacer 64 against sidewall 66 of latch plate 54.

Referring to FIG. 7B, the magnetic force applied to plunger 52 by the coil of solenoid 51 is sufficient to overcome the opposing force asserted by spring element 67 positioned between the side wall 66 of latch plate 54 and a spring retaining peg on latch assembly 50. As a result, latch plate 54 is moved, to the right in FIG. 7B, by plunger 52 and hollow spacer 64 through a slot in latch assembly 50, as shown. In this position, an aperture 71 in latch plate 54 aligns with reset flange 61 on reset pin 56 such that the second, or bottom, surface 61b of the reset flange no longer contacts the latch plate. In an exemplary embodiment, spring elements 57a, 57b (FIG. 5A, 5B) provide a resilient buffer against excessive force asserted on the reset pin by a user initiating the reset operation. Specifically, as the user presses the reset button to initiate the condition shown in FIG. 7B, springs 57a, 57b compress. Springs 57a, 57b reduce an effective force on the surface of the latch plate 54 when the shorting bar closes the reset switch to initiate the firing of the plunger 52. Because the reset switch is closed. i.e., by the shorting bar 58a, before latch assembly 50 "bottoms out" on the PCB board, springs 57a, 57b absorb some of the downward force applied by reset flange 61 on latch plate 54. This ensures that latch plate 54 moves to the desired position upon firing of plunger 52, as described above.

Figure 8:
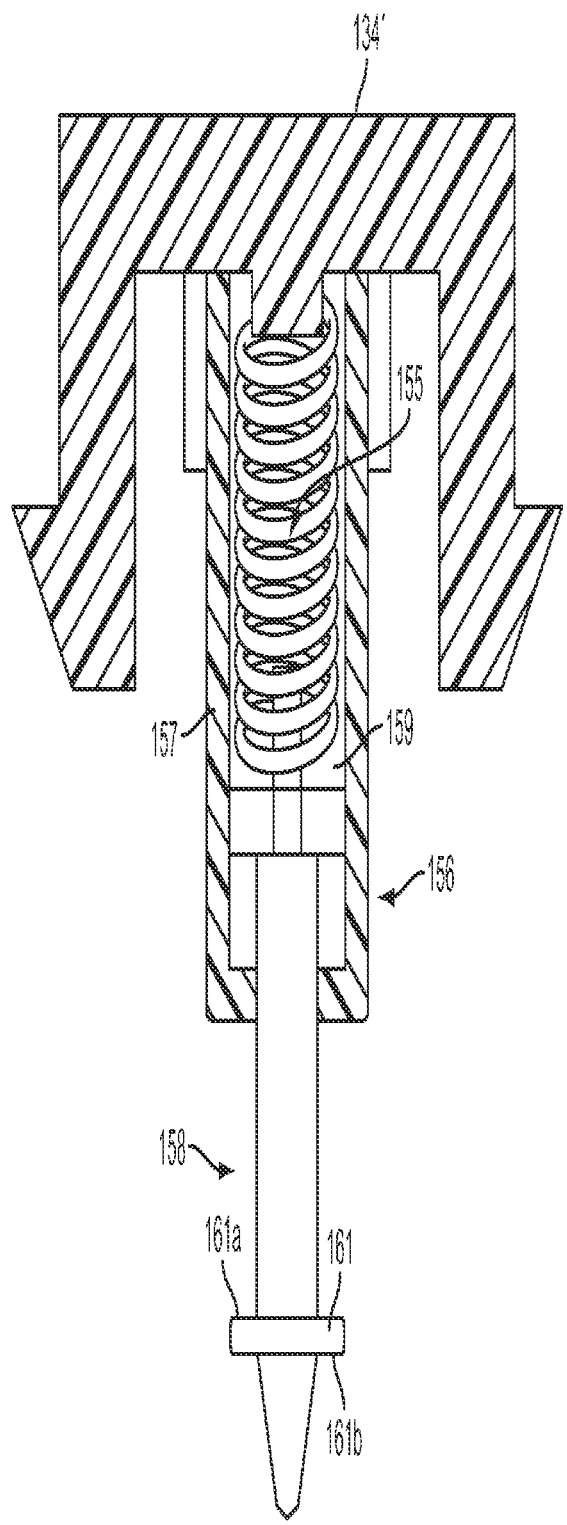
FIG. 8 is a cross-sectional view of an alternative construction for the reset pin assembly in accordance with a further embodiment of the present invention.

In a further exemplary embodiment, shown for example in FIG. 8, cylindrical reset pin 156 with internal spring element 155 is provided instead of, or in addition to, springs 57a, 57b shown in FIG. 7B. In this embodiment, shorting bar 58a may be attached directly to the lower end of the latch assembly, as opposed to having one or more intervening springs, such as springs 160a, 160b included in the embodiment of FIG. 5C. Reset pin 156 comprises at least two portions 157, 158. Upper portion 157 of reset pin 156 has a hollow cavity, 159 with a retaining peg at the top end thereof for retaining one end of spring 155. Lower portion 158 of the reset pin 156 includes reset flange 161 with upper and lower surfaces 161a, 161b, respectively, and extends outside of hollow cavity 159. Lower portion 158 is attached to the hollow upper portion 157 with a spring element 155. Spring element 155 is preferably provided with a biasing strength at least slightly greater than the upward force of the latch assembly 50. Spring element 155 provides a buffer to reduce an effective force of the reset pin 156 on latch plate 54. Thus, latch plate 54 is not prevented from moving to the desired position upon firing of plunger 52, as described above.

Figure 9A:
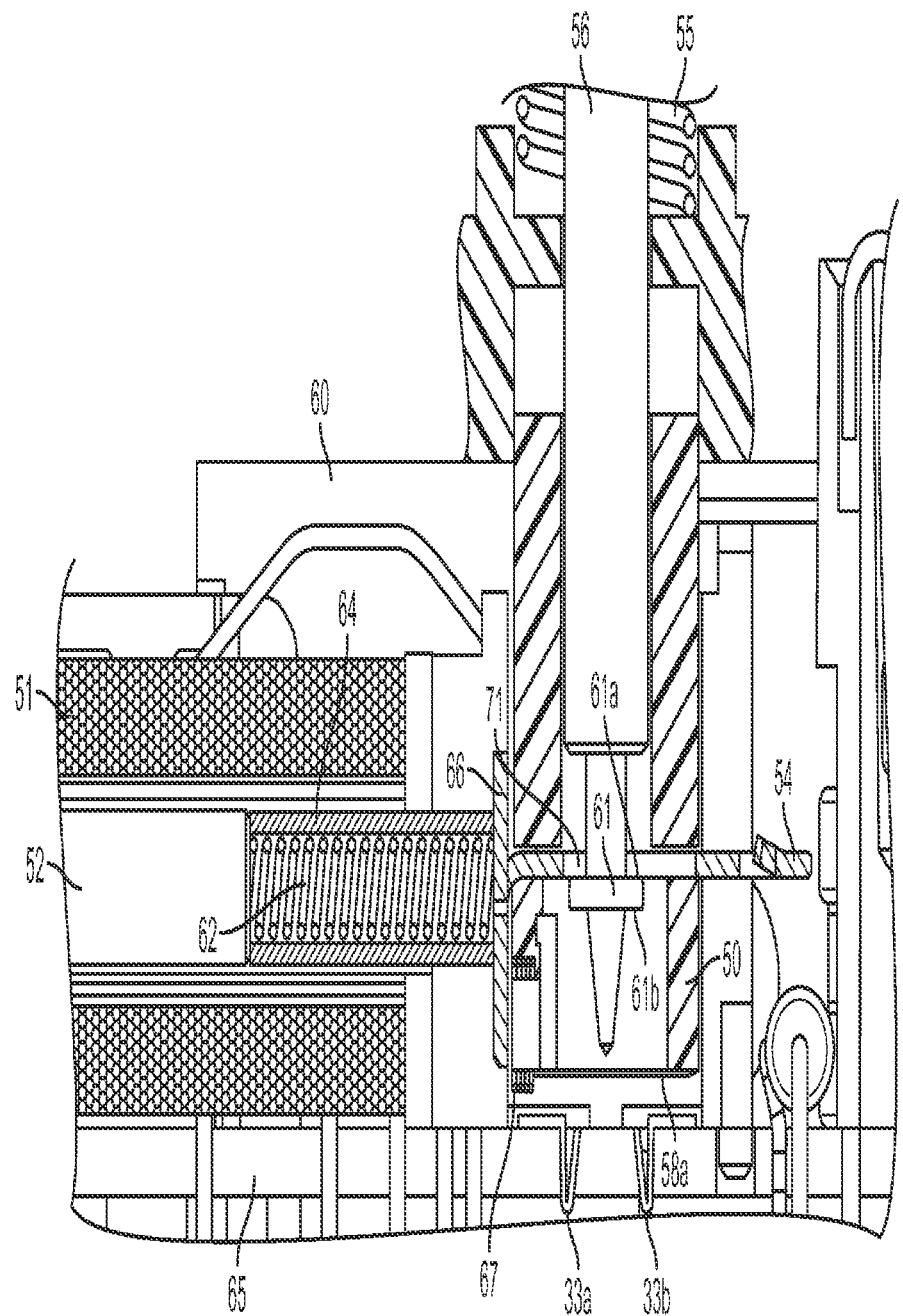
FIG. 9A is an enlarged cross sectional view of a portion of the latch assembly and reset mechanism within the solenoid housing of the ground fault circuit interrupting device of FIG. 1 after the latch plate clears the reset pin and the latch assembly is permitted to rise, opening the switch on the PCB.
Figure 9B:
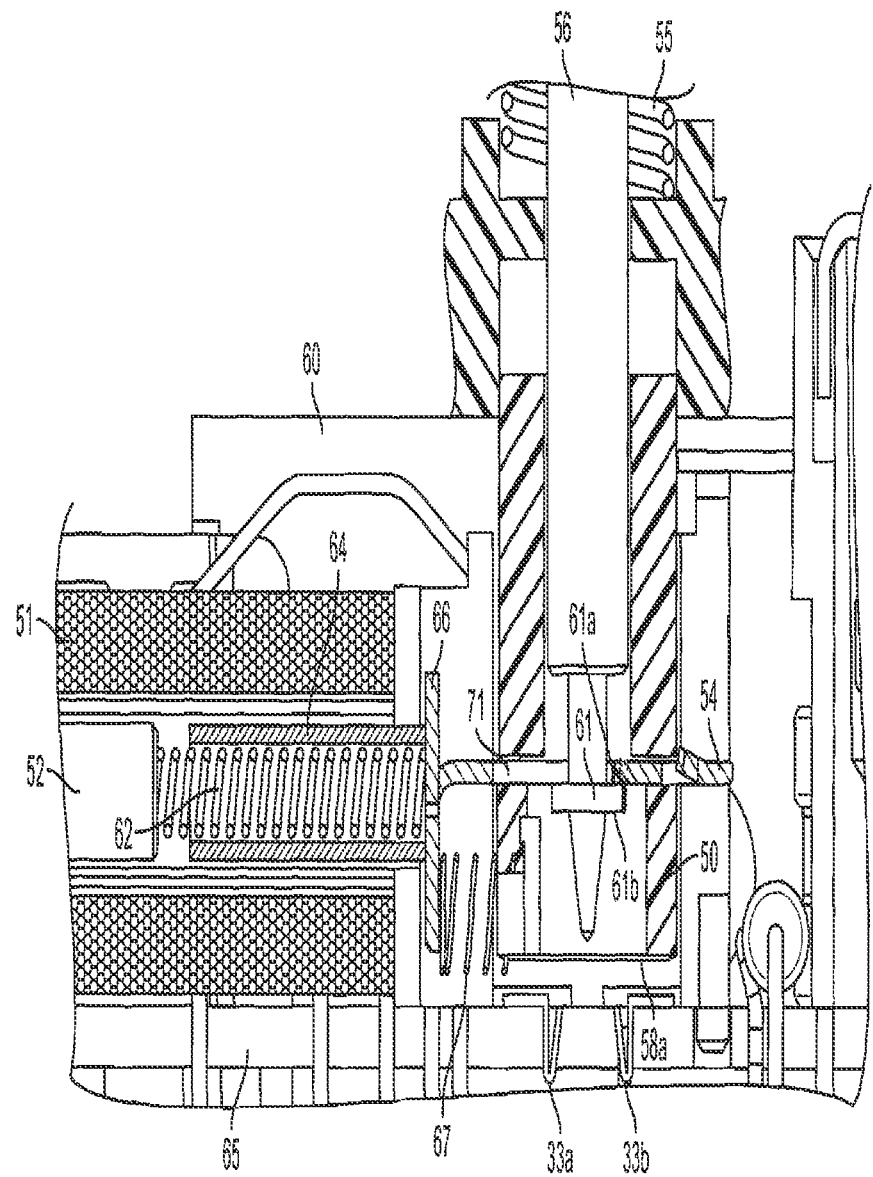
FIG. 9B is an enlarged cross sectional view of a portion of the latch assembly and reset mechanism within the solenoid housing of the ground fault circuit interrupting device of FIG. 1 after the latch plate is permitted to retract.
Figure 10:
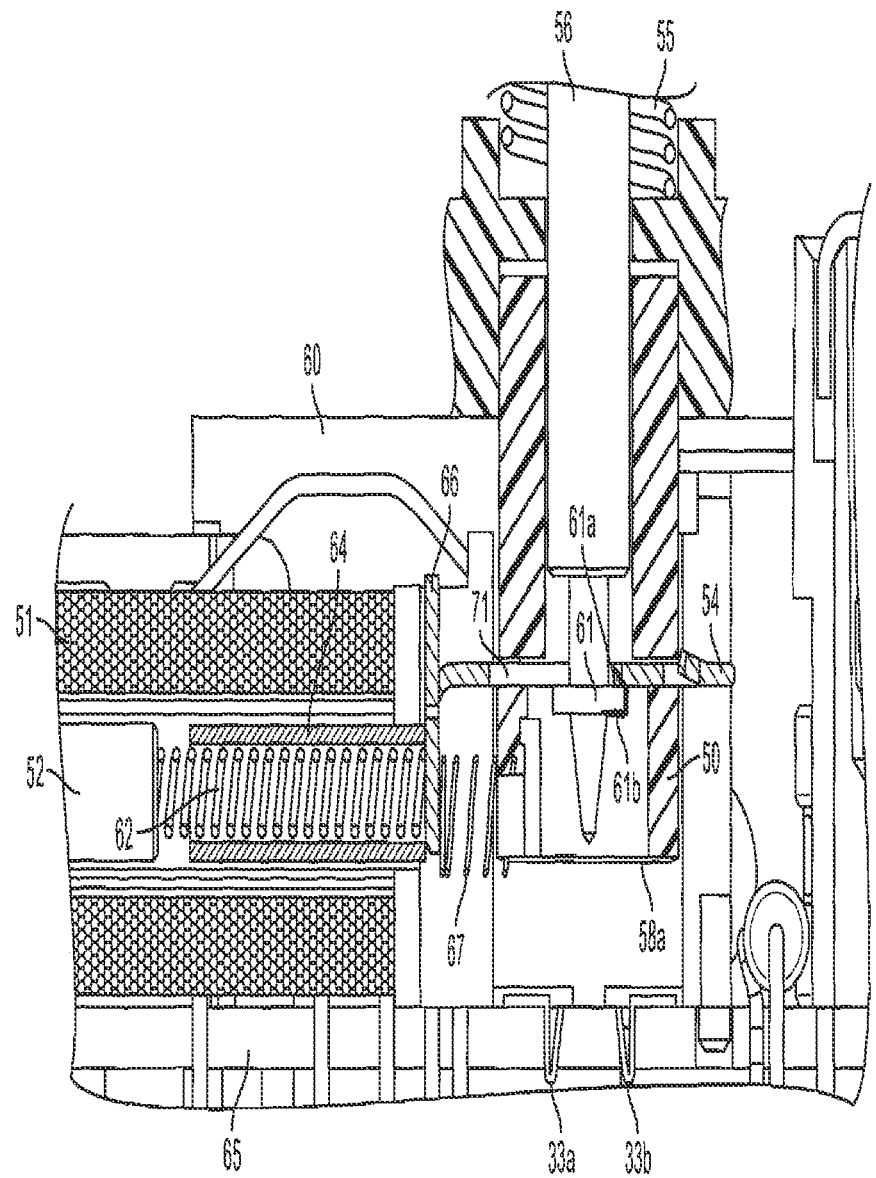
FIG. 10 is an enlarged cross sectional view of a portion of the latch assembly and reset mechanism within the solenoid housing of the ground fault circuit interrupting device of FIG. 1 after the reset pin is released and pulls the latch assembly up under the bias of the reset spring.

Regarding the embodiment illustrated in FIGS. 6A, 6B and 7A, 7B, continued pressing of reset button 34 moves reset pin 56 down through a cavity in latch assembly 50, as shown in FIG. 9A. Because the second, lower, surface 61*b* of reset flange 61 is no longer in contact with latch plate 54, the reset flange moves through aperture 71 in latch plate 54 to the position shown in FIG. 9A. Also, because latch assembly 50 is no longer forced by the pressing of the reset button against the bias of the spring elements 57*a*, 57*b*, as shown in FIGS. 5A, 5B, spring elements 57*a*, 57*b* urge the latch assembly up and away from being in contact with PCB 65. Further, because latch assembly 50 is urged away from PCB 65, shorting bar 58*a* on the latch assembly is also urged away from the PCB and no longer contacts the secondary contacts 33*a*, 33*b* on the PCB, thus, opening reset circuit 35 between the gate of SCR 49 and the GFCI IC device 70 (see e.g., FIG. 3A).

Because the gate of SCR 49 is no longer activated when shorting bar 58*a* disconnects from the secondary contacts 33*a*, 33*b*, SCR 49 transitions back to a non-conducting/non-operating state. Consequently, current is no longer drawn through solenoid 51 and the magnetic field ceases. Without the magnetic field to push plunger 52 and spacer 64 against latch plate 54, spring element 67 contacting side wall 66 of the latch plate 54, pushes spacer 64 and plunger 52 to the left in FIG. 9B and urges the latch plate to its initial position. Latch plate 54 slides sideways in the slot within latch assembly 50 such that aperture 71 in the latch plate is no longer aligned with reset flange 61. When reset button 34 is released by the user, the reset button and reset pin 56 are urged by reset return spring element 55 in the direction away from PCB 65, e.g., upward in FIGS. 9A, 9B.

Referring to FIG. 10, when the user releases the reset button (see, e.g., FIG. 4), reset pin 56, which now engages the underside of the latch plate 54 with the first, top, surface 61*a* of reset flange 61, pulls the latch plate 54 up in a direction away from PCB 65. The GFCI device 10 and latch assembly 50 are now said to be in the latched state because contacts 41, 43, 45 (FIG. 11C) are electrically connected and contacts 42, 44, 46 (FIG. 11C) are electrically connected. Because latch plate 54 is movable in the same direction as latch assembly 50, the latch assembly also moves in the same direction due to the force applied by the spring element 55 surrounding reset pin 56. Specifically, as latch assembly 50 is pulled in the "up" direction, farther away from the PCB 65, laterally extending arms 50*b* (FIG. 5B) of the latch assembly pull contacts 43, 44 on the free end of cantilevered load arms 80 and 81, respectively, into direct contact with the line contacts 41, 42 provided on the cantilevered line arms 82 and 83, respectively. When latch assembly 50 is pulled up and the device enters the latched condition, cantilevered arms 80-83 and contacts 41-44 are disposed as illustrated in FIG. 11B.

Figure 11A:
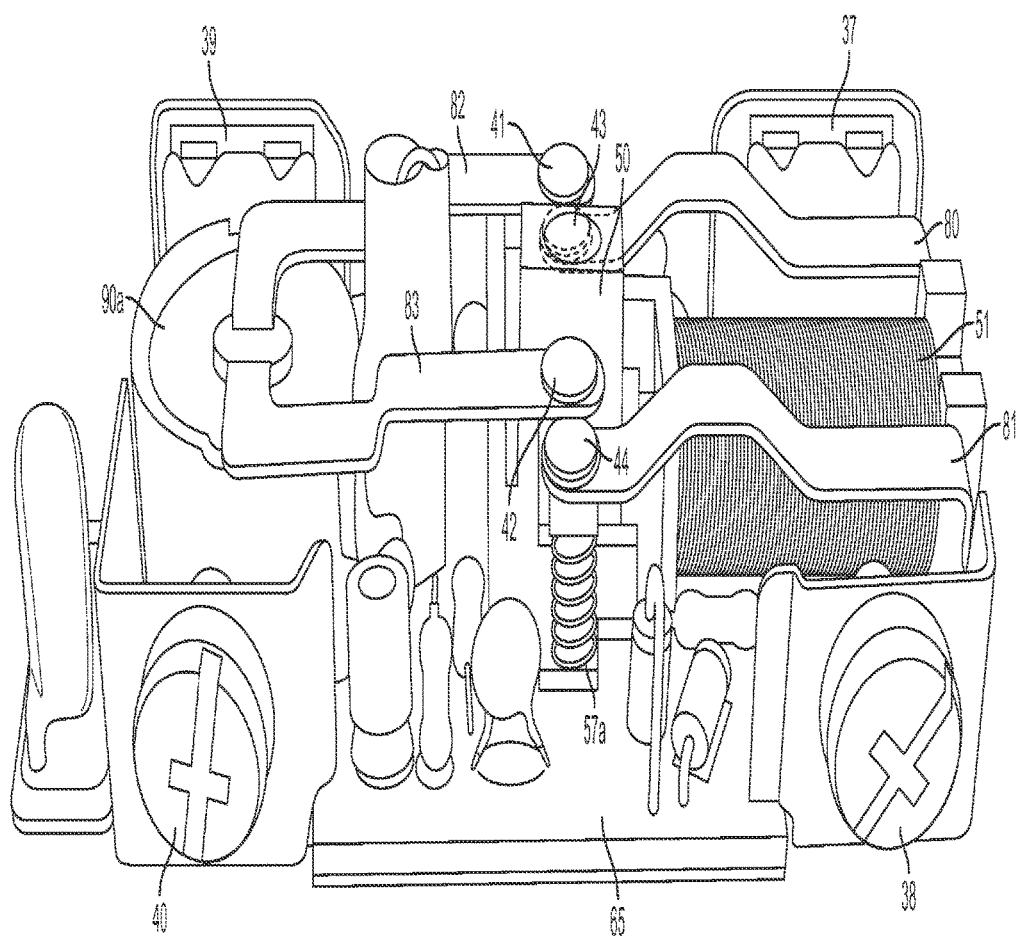
FIG. 11A is a perspective view showing the interrupter contacts in the open position and other internal components of the ground fault circuit interrupting device of FIG. 1 in accordance with an embodiment of the present invention.
Figure 11B:
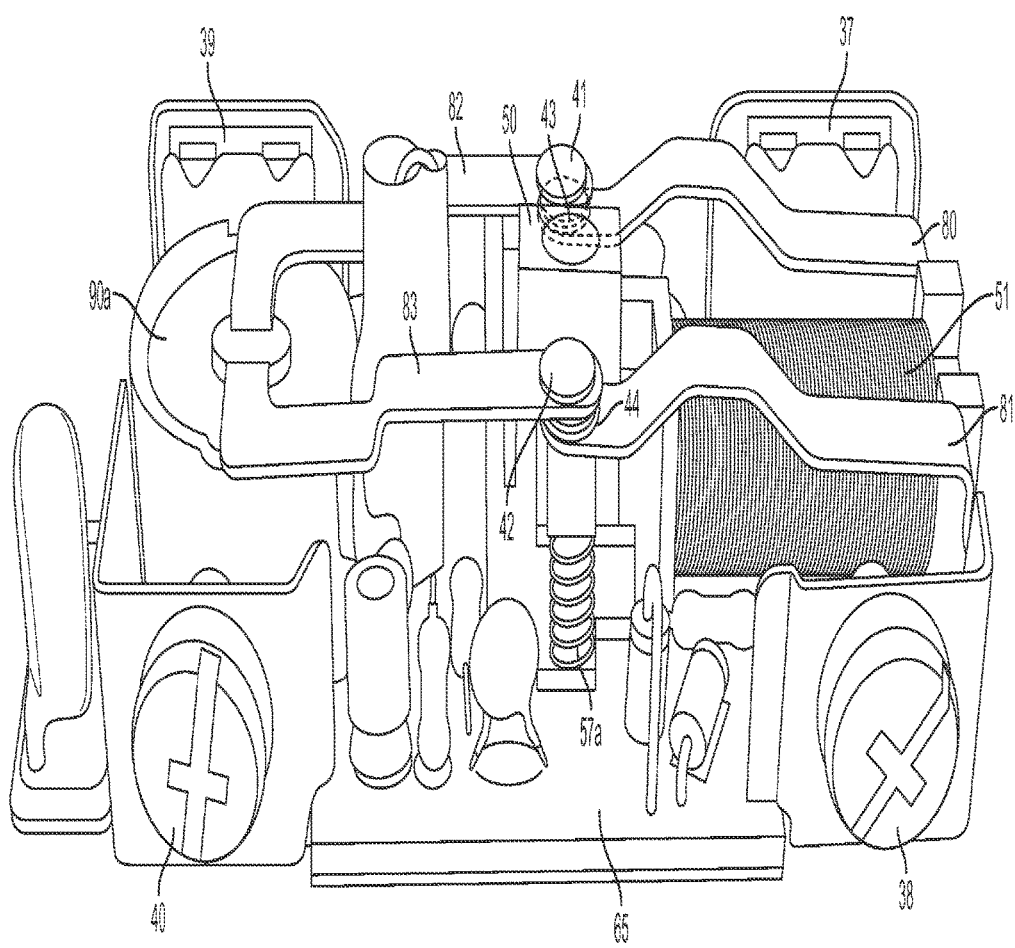
FIG. 11B is a perspective view showing the interrupter contacts in the closed position and other internal components of the ground fault circuit interrupting device of FIG. 1 in accordance with an embodiment of the present invention.

FIGS. 11A and 11B illustrate, among other things, an exemplary embodiment of the contact assembly 47 shown in FIG. 3A and described above. FIG. 11A shows GFCI device 10 in the unlatched state. As shown, in the unlatched state, line contacts 41 and 42 do not contact load contacts 43 and 44. Accordingly, no current flows between the line terminals, 39, 40 and the load terminals 37, 38. As discussed with respect to FIG. 1A, if the GFCI device is properly wired, line hot and line neutral conductors connected to an AC power supply are connected to line hot and neutral terminals 39 and 40, respectively. Load hot and load neutral conductors are similarly connected to load hot and neutral terminals 37 and 38, respectively. Line terminals 39 and 40 are electrically connected to the cantilevered line arms 82 and 83, respectively. A plurality of electrically conducting contacts, 41 and 42, are provided at the free end of the cantilevered line arms 82, 83, respectively. According to the present embodiment, line contacts 41 and 42 are staked into holes in the ends cantilevered arms 82 and 83, respectively, and include surfaces that face load contacts 43 and also include surfaces that face upward, towards face contacts 45, 46 (not shown) and 44. Face contacts 45, 46 are provided on separate electrically conducting members located on a separate housing (not shown). Although not shown, face contacts 45, 46 are electrically connected to the face terminals 18, 20 provided on the top cover 14, and electrically connect with contacts 41, 42, respectively, when the GFCI device 10 is in the latched state. Due to the natural bias of the resilient cantilevered line arms 82, 83, contacts 41, 42 are urged away from connecting to the face contacts 45, 46 when the GFCI device 10 is in the unlatched or, tripped, state.

As seen in FIG. 11A, load hot terminal 37 and load neutral terminal 38 are electrically connected to cantilevered load arms 80 and 81, respectively. Load contacts 43 and 44 are provided at the free ends of the cantilevered load arms 80 and 81, respectively, facing the line contacts 41 and 42 on the resilient cantilevered line arms 82 and 83, respectively. In the unlatched state, as shown in FIG. 11A, due to the natural bias of the cantilevered load arms 80 and 81, the load contacts are urged away from contacting with line contacts 41 and 42, respectively. As previously discussed with respect to FIG. 5A, fixed stop 68*b* provides a surface for preventing the line contacts 41 and 42 from "dropping" onto the load contacts 43 and 44, respectively. Contacts 41-46 are preferably composed of, and/or coated with, an electrically conducting material that prevents any undesired arcing between the contacts.

According to the embodiment shown in FIG. 11B, when the GFCI device enters the latched state, as described above, the bias of reset return spring element 55 forces the reset button and reset pin upwards, thus pulling the latch plate and latch block upwards as well. Laterally extending arms 50*b* (see, e.g., FIG. 5B), on either side of latch assembly 50, urge the resilient cantilevered load arms 80, 81, along with load contacts 43 and 44, upwards to make contact with line contacts 41 and 42, respectively. As the latch assembly 50 continues to move upwards, the face contacts 45 and 46 are contacted by line contacts 41, 42 which are thus, brought into electrical contact with face terminals 18 and 20. AC power is now provided to face terminals 18, 20 on the outer housing of the GFCI device and to any device connected downstream to the load terminals 37, 38. In the configuration shown in FIG. 11B, GFCI device 10 is now in the latched, or reset, state.

Because GFCI device 10 is initially provided in an unlatched state and proper wiring is required before it can enter the reset state, there is no need to provide any locking mechanism or lock-out mechanism that could potentially be defeated prior to installation. The GFCI device will only enter the reset state when the GFCI device is properly wired during installation such that AC power is provided at the line terminals. Therefore, miswire protection of GFCI device 10 cannot be defeated prior to installation and a potentially dangerous situation where the GFCI device is incorrectly wired unbeknownst to the user but power is applied to the face terminals can be prevented. Additionally, the above exemplary latching mechanism is capable of repeatedly detecting a miswire condition without any specific additional operation of the user, if the GFCI device is un-installed and then re-installed later.

Figure 11C:
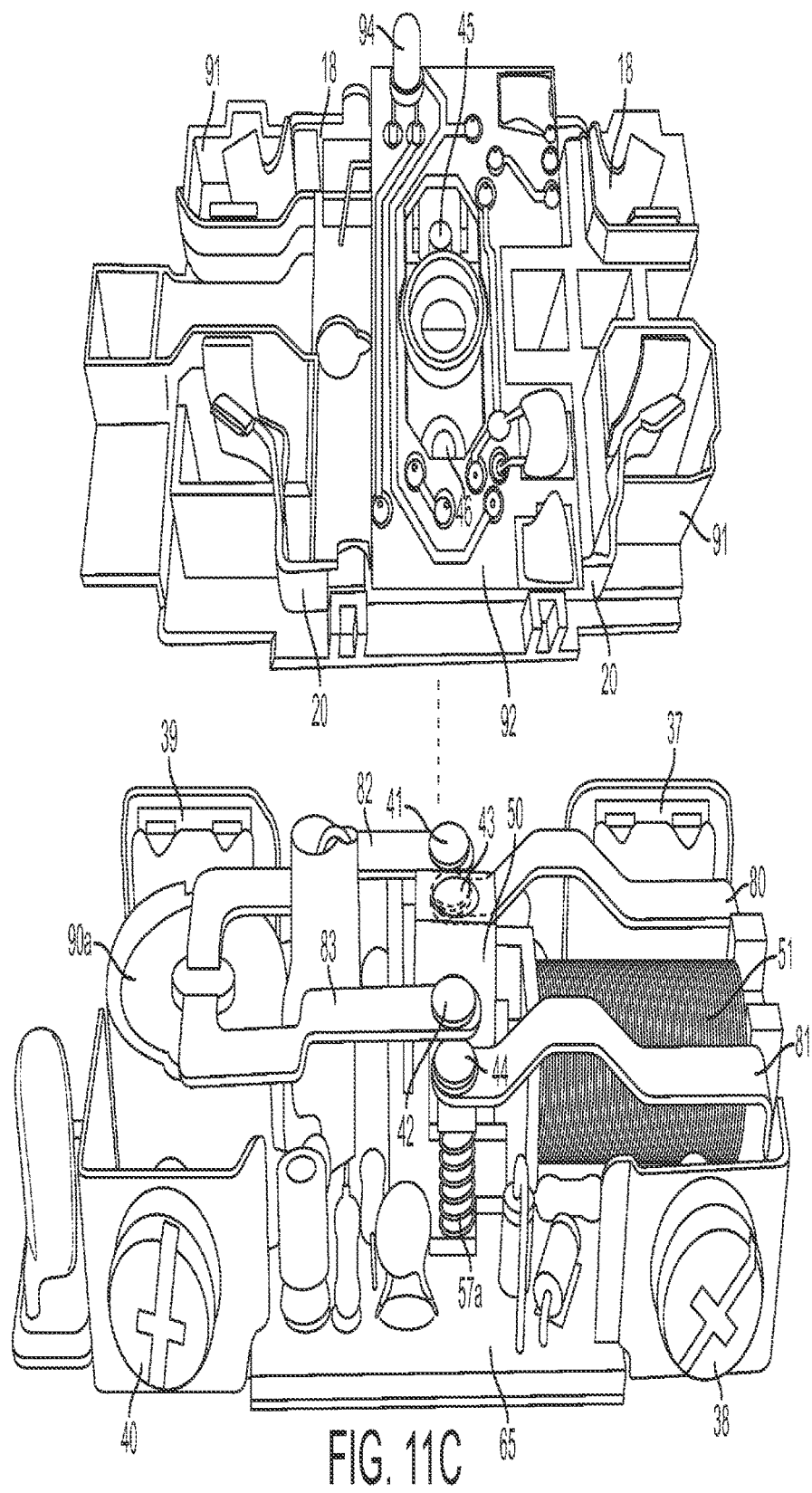
FIG. 11C is a perspective view showing the face terminal manifold holding the face terminals and the end-of-life indicator in accordance with an embodiment of the present invention.

Referring to FIG. 11C, manifold 91, made of non-conductive material, such as plastic, retains, among other things, hot face terminal 18 and neutral face terminal 20. End-of-life indicator circuit 93 (FIG. 3A), including LED 94 and other EOL circuit components, is also provided on printed circuit board (PCB) 92 adjacent face terminals 18, 20. According to the present embodiment, when the device assembled manifold 91 is disposed on top of the latch housing shown in FIGS. 11A and 11B, as indicated by the dotted line in FIG. 11C. Specifically, hot face contact 45 is axially aligned with hot line contact 41 and hot load contact 43, and neutral face contact 46 is axially aligned with neutral line contact 42 and neutral load contact 44. When GFCI device 10 is in the latched, or reset, condition, as described in detail above, all three hot contacts, 41, 43 and 45 are electrically connected together and all three neutral contacts, 42, 44 and 46 are electrically connected together. Alternatively, when the GFCI device is in the unlatched, or tripped, condition, contacts 41, 43 and 45 are electrically isolated from each other and contacts 42, 44 and 46 are electrically isolated from each other.

End-of-life circuit 93, as shown is FIG. 11C and FIG. 3 is provided on printed circuit board (PCB) 92. Referring to FIG. 3A, when GFCI device 10 is in the reset condition and test button 30 is closed, e.g., as a result of a user pressing test button 34, hot face terminal 18, which is electrically connected to hot line and hot load terminals 39, 37, respectively, is initially connected to neutral line terminal 40 through resistor 27 and test switch contact 28. Based on the value of resistor 27 this causes a test current, typically 8-9 milliamperes according to this embodiment, to be diverted around transformer 90A causing a differential, or net, current to be generated on the hot and neutral conductive paths between the hot and neutral line and load terminals. If the differential current is detected by microcontroller 70, which can be implemented by a custom programmed semiconductor device, a GFCI IC device, such as an RV4141 integrated circuit, or some other similar device useful for detecting faults in a GFCI device, the GFCI device will immediately, or at least very quickly, be placed into the unlatched, or tripped, condition and the device will be non-conductive, i.e., where no power is delivered to the face terminals or the load terminals, until the device is reset.

If GFCI IC device 70 fails to detect the differential current when test switch 30 is closed, continued pressing of test button causes test switch contact 29 to directly connect neutral line terminal 40 to hot face terminal 18 through the end-of-life indicator circuit 93. If this situation occurs, neutral line terminal 40 is first electrically connected to load face terminal 20 through a fuse 95, causing a short circuit which burns out or opens fuse 95. After fuse 95 opens, neutral face terminal 18 is connected to hot face terminal 18 through the indicator circuit 93, which includes LED 94 and capacitor 96, along with other assorted components, such as resistors for limiting the current and diodes for controlling the direction of the current flow. According to this embodiment, capacitor 96 continuously charges and then discharges through LED 94, causing the LED to blink, indicating that the GFCI device has reached the end of its useful life.

Figure 12:
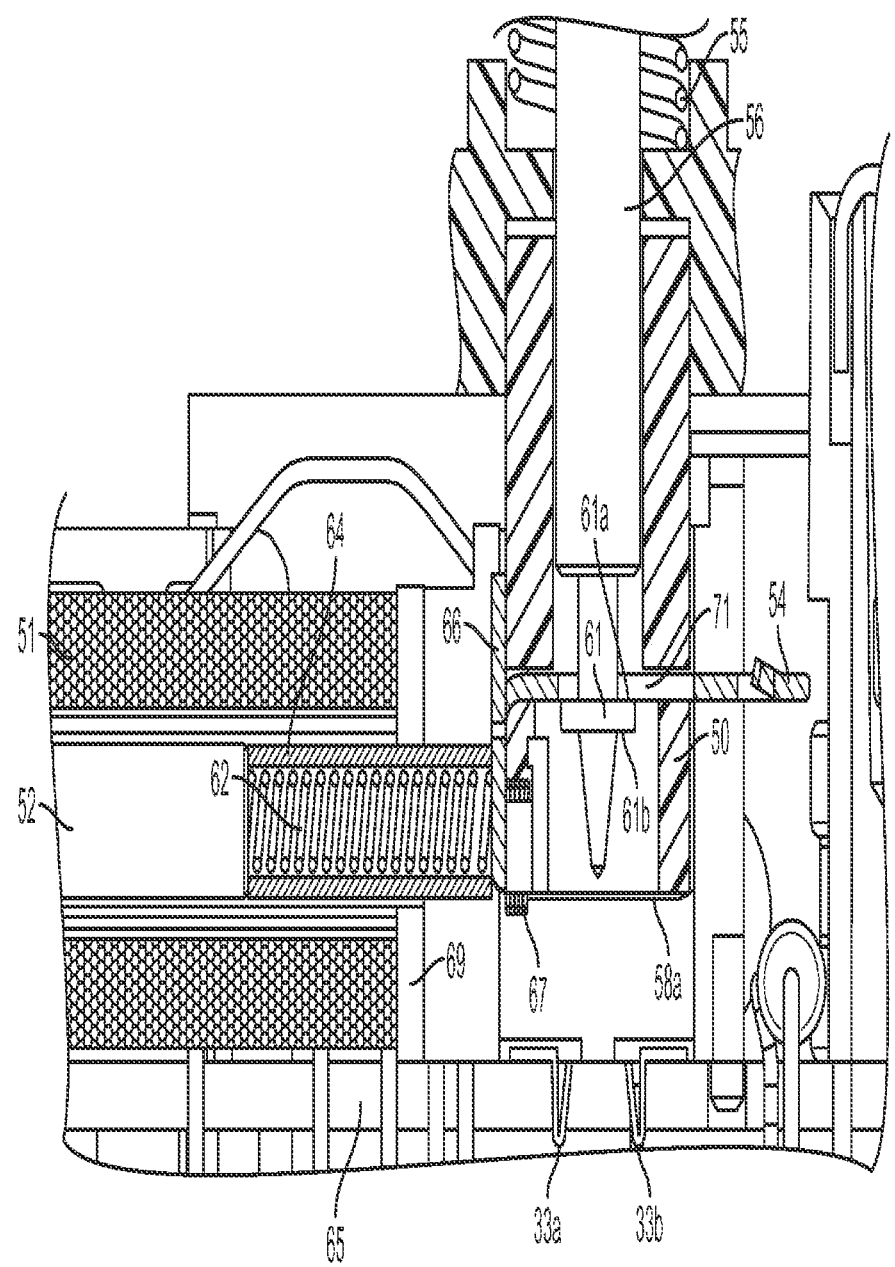
FIG. 12 is an enlarged cross sectional view of a portion of the latch assembly and reset mechanism within the solenoid housing of the ground fault circuit interrupting device of FIG. 1 after the test button is pressed and the solenoid fires, pushing the plunger into the latch plate.
Figure 13:
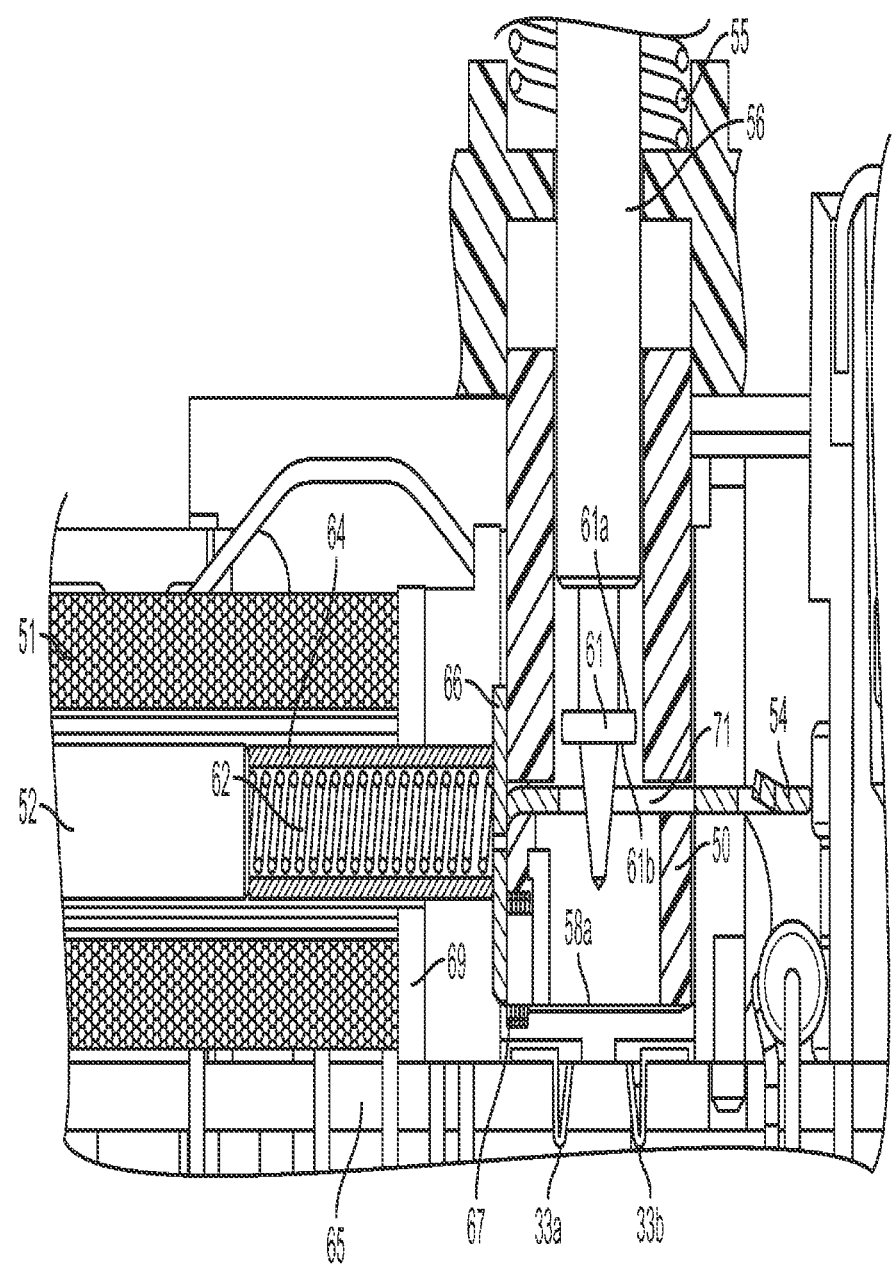
FIG. 13 is an enlarged cross sectional view of a portion of the latch assembly and reset mechanism within the solenoid housing of the ground fault circuit interrupting device of FIG. 1 after the solenoid has fired and the latch plate has cleared the reset pin allowing the latch assembly to drop and open the interrupter contacts as shown in FIG. 11B.

FIGS. 12 and 13 depict the operation of exemplary GFCI device 10 when it cuts-off power to the face terminals 18, 20, and any downstream load, when a ground fault is detected, or upon a user pressing the test button 34 (see FIG. 4) protruding from the external cover 14 as shown in FIG. 1A. Referring to FIG. 3A, when test switch 30 is closed, test circuit contact 28 is electrically connected to line terminal 40, thus completing the resistive circuit between the face terminal 18 and electrical ground, e.g., through resistor 27, simulating a ground-fault condition. More particularly, the current drawn through resistor 27 provides a detectable difference in current flowing through the sense transformer 90A, thus triggering a ground-fault response. When the simulated ground-fault or an actual ground-fault is detected, a current pulse is generated at the SCR output pin of the GFCI IC device 70, which is connected to the gate terminal of SCR 49. As described above with respect to the reset operation, the current pulse transitions SCR 49 into the conducting state drawing current through solenoid 51. A resultant magnetic field is created that urges plunger 52 within the solenoid in the direction of side wall 66 of the latch plate 54. Latch plate 54 moves laterally through latch assembly 50 against the bias of spring element 67 to the "fired" position. In this position, aperture 71 in latch plate 54 aligns with the reset flange 61 of the reset pin 56, as shown in FIG. 12, allowing the reset flange to pass through the aperture 71.

Because latch plate 54 is no longer engaged with reset flange 61 of reset pin 56, and reset flange 61 travels through aperture 71, latch assembly 50 is urged by the natural bias of cantilevered load arms 80, 81 to move, e.g., downward in FIG. 12, thus carrying latch plate 54 downward past reset flange 61 in a direction towards PCB 65. As load arms 80,81 move, or drop, in this direction, load contacts 43, 44 separate from line contacts 41, 42, as shown for example in FIG. 11A. Line cantilever arms 82, 83 also flex downward under their respective natural bias and line contacts 41, 42 separate from face contacts 45,46. Thus, no current can flow from line terminals 39, 40 to either the face terminals 18, 20 or the load terminals 37, 38.

As mentioned, latch assembly 50 is urged downward in the direction of PCB 65 when a real or simulated ground fault occurs. Latch assembly 50 is prevented from contacting the PCB 65 in this situation, however, due to the reactive forces of spring elements 57a, 57b, and the at least one built-in stop 68a of the solenoid housing 60, e.g., as shown in FIG. 5A. Latch assembly 50, thus, returns to its initial suspended position, shown in FIG. 13, and the latch assembly is now in the unlatched, or tripped, state. After the test condition or ground fault is cleared, a current pulse is no longer supplied at the gate terminal of SCR 49, and the SCR returns to the non-conducting state. Because current is no longer being drawn through solenoid 51, the magnetic field is lost and plunger 52 is no longer urged against the side wall 66 of the latch plate 54. Latch plate 54 returns to its initial position under the bias of spring element 67, as shown in FIG. 6A. Latch assembly 50 remains in this position until the user initiates the reset of the GFCI device 10 by once again pressing the reset button 34 as described above in reference to FIGS. 6A-10.

Further details with respect to the circuit depicted in FIG. 3B will now be described. Specifically, as mentioned previously several of the structural and functional details of the circuit of FIG. 3B are similar to those of the circuit shown in FIG. 3A and, in fact, the circuit of FIG. 3B is consistent with the mechanical operation described in regard to both GFCI device 10 and GFCI device 100, described above. The circuit of FIG. 3B, however, includes several structural and functional differences over the circuit of FIG. 3A. Those differences will now be described.

Referring to FIG. 3B, an electrical circuit consistent with the operation of the present invention includes phase line terminal 326 and neutral line terminal 328 for electrical connection to an AC power source (not shown). Phase conductor 330 and neutral conductor 332 are respectively connected to the phase and neutral line terminals and each pass through sense transformer 334 and grounded neutral transformer 336, which are part of a detection circuit described below. By way of example, phase and neutral line conductors 330, 332 represent line contact arms 82, 83, respectively, as described above with respect to FIGS. 11A, 11B, according to one exemplary embodiment of the invention. Line conductors 330, 332 are each cantilevered with respective fixed ends connected to the line terminals and each includes a respective movable contact, e.g. contacts 41, 42 from the embodiment described above. Face phase and face neutral conductors 338, 340, respectively, include electrical contacts, for example contacts 45, 46 in the embodiment described above in reference to FIG. 11C. The face conductors are electrically connected to and, in the embodiment shown are integral with, respective face terminals 342, 344, to which plug blades would be connected when the electrical receptacle device is in use.

The circuit shown in FIG. 3B also includes optional load phase and load neutral terminals 346, 348, respectively, which electrically connect to a downstream load, such as one or more additional receptacle devices. For example, when the circuit shown in FIG. 3B is used in a GFCI device such as the one shown in FIGS. 1B and 2B, load phase and load neutral terminals would likely not be included as no downstream loads are connected to the device. Load terminals 346, 348, when included, are respectively connected to cantilevered load conductors 277, 278, each of which includes a movable contact at its distal end. For example, load conductors 277, 278 correspond to cantilever arms 80, 81 in FIG. 11C which respectively include contacts 43, 44. As shown, for example, in FIG. 11C, load contacts 43, 44, are disposed below respective phase and neutral line contacts 41, 42, and phase and neutral face contacts, 45, 46, and are coaxial with them such that when the load contacts are moved toward the line contacts, and the face contacts, the three sets of contacts will mate and be electrically connected together, e.g., in the reset state described above.

The Detector Circuit

A detector circuit 352 includes transformers 334, 336 as well as a GFCI integrated circuit device (GFCI IC), 350. GFCI IC 350 can be one of the following or similar devices, such as, an RV4141 or RV4145 device, both made by Fairchild Semiconductor Corporation, a Fudan FM2141 device, a Crys-Lattice CL4141 device, or it can be a custom device or circuit. GFCI IC 350 receives electrical signals from transformers 334, 336 and determines if one or more faults, either real or simulated, has occurred. For example, when a current imbalance between line conductors 330, 332 occurs, a net current flows through the transformers which causes a magnetic flux to be created in the area of, for example, sense transformer 334. This flux results in electric current on the conductors that connect the sense transformer 334 to the input (IN) of GFCI IC 350, that is, current is generated at the transformer secondary. If the current in the transformer secondary exceeds a predetermined threshold for longer than a predetermined delay time, a detection signal is generated at one or more of the outputs of GFCI IC 350, such as the SCR output, which triggers SCR 359.

The current imbalance on line conductors 330, 332 results from either a real ground fault or a test ground fault. A test or simulated ground fault is generated by pressing the test button, e.g., button 30 in FIGS. 1A and 1B, closing test switch 354. As described in further detail below, another condition that causes a flux to be generated at one or more of the transformers and, thus, the detection signal to be generated by the GFCI IC, is when the auto-monitoring circuit 370 initiates a self-testing test sequence that includes a current generated on independent conductor 356.

When test switch 354 is closed, some of the current flowing in line conductors 330, 332 is diverted around sense transformer 334 and through resistor 358 to the face phase conductor 338. By diverting some of the current through resistor 358, an imbalance is caused in the current flowing in one direction through conductor 330 and the current flowing in the opposite direction through conductor 332. This current imbalance, i.e., net current, is detected by detector circuit 352 and the SCR output of GFCI IC 350 is activated as described above.

When the SCR output of GFCI IC 350 is activated the gate of SCR 359 is triggered allowing current to flow through SCR 359 creating a voltage on the gates of SCR 360 and 320 and, thus, triggering these two SCRs. When SCR 360 is triggered current is permitted to flow through one of the coils, 362, of dual coil solenoid 366 and when SCR 320 is triggered current is permitted to flow through the second coil, 364, of dual coil solenoid 366.

The current flowing through coils 362 and 364 generates a combined magnetic field that moves an armature, or plunger, within solenoid 366. When the solenoid armature moves, it forces a latch plate, such as latch plate 54 in the embodiments described above, and a latch block, such as latch block 50 above, drops under the natural bias of either the line or load conductors away from the face conductors and, thus, opening interrupting device 315. The device is now said to be "tripped," as a result of the successful manual test sequence, and the device is ready to be reset. The time it takes from the moment test switch 354 closes until the device is tripped and current no longer flows, particularly through trip coils 362 and 364, is sufficiently short such that fuses 368 and 370 remain intact.

Manual Testing Via the Reset Operation

With continued reference to FIG. 3B, as described above with respect to the mechanical aspects of embodiments of the invention, closing the reset switch 300, e.g., by pressing reset button 34 as described with respect to the above embodiments, also initiates a test operation. Specifically, when reset switch 300 is closed, a voltage supply output, VS, of GFCI IC 350 is electrically connected to the gate of SCR 360 via conductor 308, thus, turning ON SCR 359 which, in turn, turns ON SCRs 360 and 320. As described above, when SCRs 360 and 320 are energized, current is permitted to flow through coils 362 and 364. The current flowing through coils 362, 364 generates a combined magnetic field in solenoid 366 and the armature within the solenoid is actuated and moves. Under typical, e.g., non-test, conditions the armature is actuated in this manner to trip the device, such as when an actual ground fault or a manual ground fault via the test button occurs.

In this particular situation, however, the device is already in the tripped condition, i.e., the line and face (and possibly load) contacts are already electrically isolated, hence the need to press the reset button. For example, in this situation the reset button was most likely pressed to re-latch the interrupting device and bring the line, load and face contacts back into electrical contact. This reset operation is described in detail above in regard to FIGS. 6A, 6B, 7A, 7B, 9A, 9B and 10. For example, the contacts on reset switch 300 in FIG. 3B correspond to contacts 33a, 33b described above. If the armature of solenoid 366 fails to fire, and the reset mechanism, including the latch plate described above, fails to engage the reset plunger on its return after the reset button is released, the device will not be reset. Accordingly, if, for example, the device is not wired at all, or it is miswired with the AC power not connected to the line terminals, e.g., 326, 328, no power is applied to the GFCI IC 350. If no power is applied to GFCI IC 350 it cannot drive SCR 359, or SCRs 360 and 320, and the device will not be able to be reset, as described above. Thus, the miswire condition is prevented because the device cannot be reset until AC power is properly applied to the line terminals.

The Auto-Monitoring Circuit

With continued reference to the exemplary circuit schematic shown in FIG. 3B, the auto-monitoring circuit 370 of the present embodiment will now be described. Auto-monitoring circuit 370 includes a programmable device 301. Programmable device 301 can be any suitable programmable device, such as a microcontroller or a microprocessor, which can be programmed to implement the auto-monitoring routine as explained in detail below. For example, programmable device 301 can be implemented by an ATMEL™ microcontroller from the ATtiny 10 family or a Microchip microcontroller such as a PIC10F204/206. Also, the input of an optocoupler device 380 is coupled to the hot and neutral load terminals 346, 348 and the output of optocoupler 380 is coupled to the microcontroller 301. When AC power is applied to the line terminals of the GFCI device, optocoupler 380 provides a particular signal to the microcontroller when the interrupting device (315) is closed, i.e., the device is "reset," and optocoupler 380 provides a different signal to the microcontroller when the interrupting device is open, i.e., the device is "tripped." For example, when the interrupter is closed a voltage of approximately 2.5 volts is present at the OC input of microcontroller 301. When the interrupter is open, a voltage of approximately 3.6 volts is presented at the OC input port.

According to one exemplary auto-monitoring, or automatic self-testing, routine in accordance with this embodiment, programmable device 301 initiates the routine approximately every three (3) seconds by setting an auto-monitoring test flag. The auto-monitoring test flag initiates the auto-monitoring routine on the circuit interrupting device and confirms that the device is operating properly or, under certain circumstances, determines that the circuit interrupting device has reached its end-of-life (EOL). Moreover, this automatic self-testing routine occurs on either half-cycle of the AC wave, i.e., either the positive or negative half-cycle. When the auto-monitoring routine runs with a positive result, the auto-monitoring circuit enters a hibernation state until the programmable device sets the test flag again and initiates another auto-monitoring routine.

If the auto-monitoring routine runs with a negative result, e.g., it cannot be determined that the circuit interrupting device is functioning properly, a failure counter is incremented and the programmable device initiates another auto-monitoring routine when instructed. In addition to the failure count being incremented, a temporary indication of the failure can also be provided. For example, a Light Emitting Diode (LED) may be flashed one or more times, or an audible buzzer can be activated, to indicate the failure to a user. If the failure counter reaches a predetermined value, i.e., the auto-monitoring routine runs with a negative result a predetermined number of times, the auto-monitoring routine invokes an end-of-life (EOL) sequence. The EOL sequence then performs one or more of the following functions; (a) indicates that EOL has been reached, for example, by continuously flashing or illuminating an indicator light and/or generating an audible sound, (b) attempts to trip the device, (c) prevents an attempt to reset the device, (d) stores the EOL event on non-volatile memory, e.g., in the event there is a power failure, and (e) clears the EOL condition when the device is powered down.

In accordance with this embodiment, when the programmable device determines it is time to run the auto-monitoring routine, a stimulus signal 302 is turned ON by programmable device 301. When the stimulus signal is turned ON, electric current flows through resistor 303 and transistor 304 is turned ON. When transistor 304 is turned ON, current flows from the 3.3V voltage supply through resistor 305, which is, for example, a 3 k-ohm resistor, and continues through electrical conductor 356 and transistor 304 to ground. According to this exemplary embodiment, electrical conductor 356 is a wire connected at one end to resistor 305, traverses through the centers of sense transformer 334 and grounded neutral transformer 336 and is looped approximately six (6) times around the cores of these transformers and is connected at its other end to the collector-emitter of transistor 304. Thus, when the software auto-monitoring test flag is set in device 301 and transistor 304 is turned ON, current flows through conductor 356 which comprises an independent third conductor, e.g., separate from the two, hot/phase and neutral, conductors 330 and 332 that also traverse through the centers of transformers 334 and 336.

If the circuit interrupting device according to the present embodiment is functioning properly, when current flows through third conductor 356, thus creating a net current flow through sense transformer 334, a flux is generated at the transformer which is detected by detection circuit 352, including GFCI device 350. In accordance with this embodiment, when device 350 detects the flux created at 334, a voltage level is increased at one of the output ports of device 350, for example at the output port labeled CAP in FIG. 3B, thus increasing the voltage on conductor 306. Because conductor 306 is connected to a capacitor, 307, the SCR trigger signal 308 of device 350 is delayed for a predetermined period of time, i.e., determined by the value of capacitor 307. For example, if capacitor 307 is a 1.8 nF capacitor and device 350 is an RV4141 device, SCR trigger signal 308 is delayed for 3.333 msec. Further, the CAP output, 306, of device 350 is connected to programmable device 301 via a conductive path that includes conductor 309 and diode 310 in series with resistor 311, e.g., 4.7 k-Ohm, which completes a voltage divider with resistor 312, e.g., 1 M-Ohm.

According to this embodiment, programmable device 301 has an analog-to-digital converter (ADC) whose input is connected to conductor 309. Accordingly, the ADC of device 301 reads the increasing voltage established on capacitor 307. When a predetermined voltage level is reached at the ADC input of programmable device 301, device 301 turns OFF the auto-monitoring stimulus signal by setting the TST output to logic low, thus, turning off transistor 304 and stopping the current flow on conductor 356 and, thus, the flux created at transformer 334. When this occurs, it is determined by programmable device 301 that a qualified auto-monitoring event has successfully passed and the auto-monitoring fail counter is decremented if the present count is greater than zero.

According to this embodiment, an auto-monitoring routine is repeated by programmable device 301 on a predetermined schedule. For example, based on the software program installed within the device, the auto-monitoring routine is programmed to be run, as desired, anywhere from every few seconds to every month, etc. When the routine is initiated, the flux created at sense transformer 334 occurs similarly to the way a flux would be created if either an actual ground fault had occurred or if a simulated ground fault had been manually generated, e.g., by pressing the test button as described above.

That is, when either an actual or simulated ground fault occurs, a difference in the current flowing in the phase and neutral conductors, 330 and 332, respectively, is created. This differential, or net, current flowing through sense transformer 334 is detected by device 350 which, as a result, drives SCR 359 to turn ON via conductor 308, which turns ON SCRs 360 and 320. When SCRs 360 and 320 turn ON, current passes through coils 362 and 364, respectively, which trips interrupting device 315, i.e., causing the latch block to drop and the line and face (and possibly load) contacts to separate from each other. Thus, current is prevented from flowing through phase and neutral conductors 330 and 332 to the phase and neutral face terminals, 342 and 344, respectively, and the phase and neutral load terminals, 346 and 348, respectively, when such external load terminals are included on the device.

In comparison, when the auto-monitoring routine is performed in accordance with the present invention, no differential current is created on the phase and neutral conductors 330, 332 and the interrupting device 315 is not tripped. Instead, during the auto-monitoring routine, the flux generated at sense transformer 334 is a result of current flowing through a single, independent third, conductor 356, electrically isolated from phase and neutral conductors 330, 332. The current generated on conductor 356 is present for only a brief period of time, for example, less than the delay time established by capacitor 307, discussed previously.

Thus, if the voltage on conductor 309, which is input to the ADC input of programmable device 301, reaches a given voltage within this predetermined period of time during an auto-monitoring routine, it is determined that the detection circuit 352 successfully detected the net current flowing through sense transformer 334 on conductor 356 and the auto-monitoring event is determined to have passed. Accordingly, programmable device 301 determines that detection circuit 352, including GFCI device 350, is working properly. Because the net current flowing through sense transformer 334 during the auto-monitoring routine is designed to be substantially similar in magnitude to the differential current flowing through the sense transformer during a simulated ground fault, e.g., 4-6 milliamps, it is determined that detection circuit 352 would be able to detect an actual ground fault and provide the proper drive signal to SCR 359 to trip interrupter 315.

Alternatively, the auto-monitoring circuit 370 might determine that the auto-monitoring routine has failed. For example, if it takes longer than the predetermined period of time for the voltage at the ADC input of programmable device 301 to reach the given voltage during the auto-monitoring routine, it is determined that the auto-monitoring event failed. If this occurs, an auto-monitoring fail tally is incremented and the failure is indicated either visually and/or audibly. For example, according to one embodiment, the ADC port of programmable device 301 is converted to an output port when an auto-monitoring event failure occurs and a voltage is placed on conductor 309 via the converted I/O port, generating a current on conductor 309, which flows through indicator LED 316 and/or buzzer circuit 319 and resistor 317 to ground. Subsequently, the ADC I/O port of programmable device 301 is converted back to an input for the next scheduled auto-monitoring event.

For example, when an auto-monitoring event failure occurs, indicator LED 316 illuminates, and/or buzzer circuit 319 is activated, only for the period of time when the I/O port is converted to an output and an output voltage is generated at that port; otherwise LED 316 remains dark, or non-illuminated and buzzer circuit 319 is silent. Conditions that cause the auto-monitoring routine to fail include one or more of the following, (1) open circuited differential transformer, (2) closed circuited differential transformer, (3) no power to the GFCI IC, (4) open circuited solenoid, (5) SCR trigger output of the GFCI IC continuously high, and (6) SCR output of the GFCI IC always inactive.

According to a further aspect of this embodiment, if the auto-monitoring fail tally reaches a predetermined limit, for example, seven (7) failures within one (1) minute, programmable device 301 enters an end-of-life (EOL) state. If this occurs, an audible or visual indicator is activated to alert the user that the circuit interrupting device has reached the end of its useful life. For example, when an EOL state is determined, the ADC I/O port of programmable device 301 is converted to an output port, similar to when a single failure is recorded as described above, and a signal is either periodically placed on conductor 309 via the ADC output port, i.e., to blink LED 316 and/or activate buzzer circuit 319, or a signal is continuously placed on conductor 309 to permanently illuminate LED 316 and/or activate the buzzer. The auto-monitoring routine is also halted at this time. Also, when an EOL state has been determined, microcontroller 301 looks for a voltage of greater than 3.1 volts at the OC input port to determine whether the interrupter contacts are open. If the voltage is less than 3.1 volts, it is determined that the reset button has been pressed and the microcontroller will trigger SCRs 320 and 360 once every three (3) seconds until the voltage at the OC input goes above 3.1 volts, i.e., indicating that the interrupter contacts have opened.

Additionally, according to a further embodiment, when EOL is determined, programmable device 301 attempts to trip interrupting device 315 in one or both of the following ways: (a) by maintaining the stimulus signal on third conductor 356 into the firing half-cycle of the AC wave, and/or, (b) by converting the EOL port of programmable device 301 to an output, if it is currently an input port, and placing a drive signal on conductor 318 to directly drive the gate of SCRs 320 and 360, thus, enabling these SCRs to conduct current and activate the solenoid. More specifically, when SCRs 320 and 360 are turned ON, current is drawn through coils 364 and 362 of dual coil solenoid 366. For example, dual coil solenoid 366 includes primary coil 364, which comprises a 800 turn, 18 Ohm coil, and secondary coil 362, which comprises a 950 turn, 16.9 Ohm coil.

Accordingly, when it is determined via the auto-monitoring routine that detection circuit 352 is not successfully detecting ground faults, e.g., it does not detect the flux resulting from current flowing in conductor 356, or that it is not otherwise generating a drive signal on conductor 308 to drive SCR 359 upon such detection, programmable device 301 determines EOL and attempts to trip interrupting device 315 by one or both of two separate methods. Specifically, device 301 attempts to directly trip interrupting device 315 by either, (a) continuing to generate the signal on conductor 356, or, (b) directly driving the coils 362 and 364, or, it performs both, (a) and (b). There is one significant difference, however, between the signal on conductor 356 when the auto-monitoring routine is being run normally, and the signal on conductor 356 that is generated when EOL is determined. In particular, under EOL conditions, the signal, e.g., electrical pulse, on conductor 356 is extended into, or otherwise generated in, the firing half-cycle of the AC wave. This should generate flux at sense transformer 334 which, assuming all else is working properly, triggers SCR 359 which, in turn, triggers SCRs 320 and 360, and energizes coils 364 and 362, thus activating the solenoid to trip the interrupting device 315.

When the second method, (b), above, is employed, that is, SCRs 359, 360 and 320 are triggered to draw current through coils 364 and 362 to trip interrupting device 315, the current is also drawn through fuses 368 and 370, each of which comprises, a regular fuse, a fusible resistor, or any other fusible element, such as a drip of solder. If interrupting device 315 fails to open and, in particular, open in a very short amount of time, the current being drawn through fuses 368 and 370 will destroy the fuses, i.e., causing open-circuits, and the current will no longer flow, leaving no further opportunities for the programmable device 301 to trip interrupting device 315.

Further, if either of the two methods described above, (a) or (b), results with interrupting device 315 being opened, or if interrupting device 315 was otherwise already open, power-on indicator circuit 321 will be OFF. For example, in the embodiment shown in FIG. 3B, power-on indicator circuit 321 includes LED 322 in series with resistor 323 and diode 324. One lead of LED 322 is connected to the neutral face terminal 344 and one lead of diode 324 is connected to phase face terminal 342. Accordingly, when power is available at the face terminals, current is drawn through the power-on circuit on each alternating half-cycle of AC power, thus, making LED 322 blink. If, on the other hand, power is not available at the face terminals 342, 344, for example, because interrupting device 315 is open, or tripped, then LED 322 will be dark, or not illuminated.

Additional embodiments and aspects thereof, related to the auto-monitoring functionality consistent with the present invention, as well as further discussion of some of the aspects already described, are provided below.

Figure 5C:
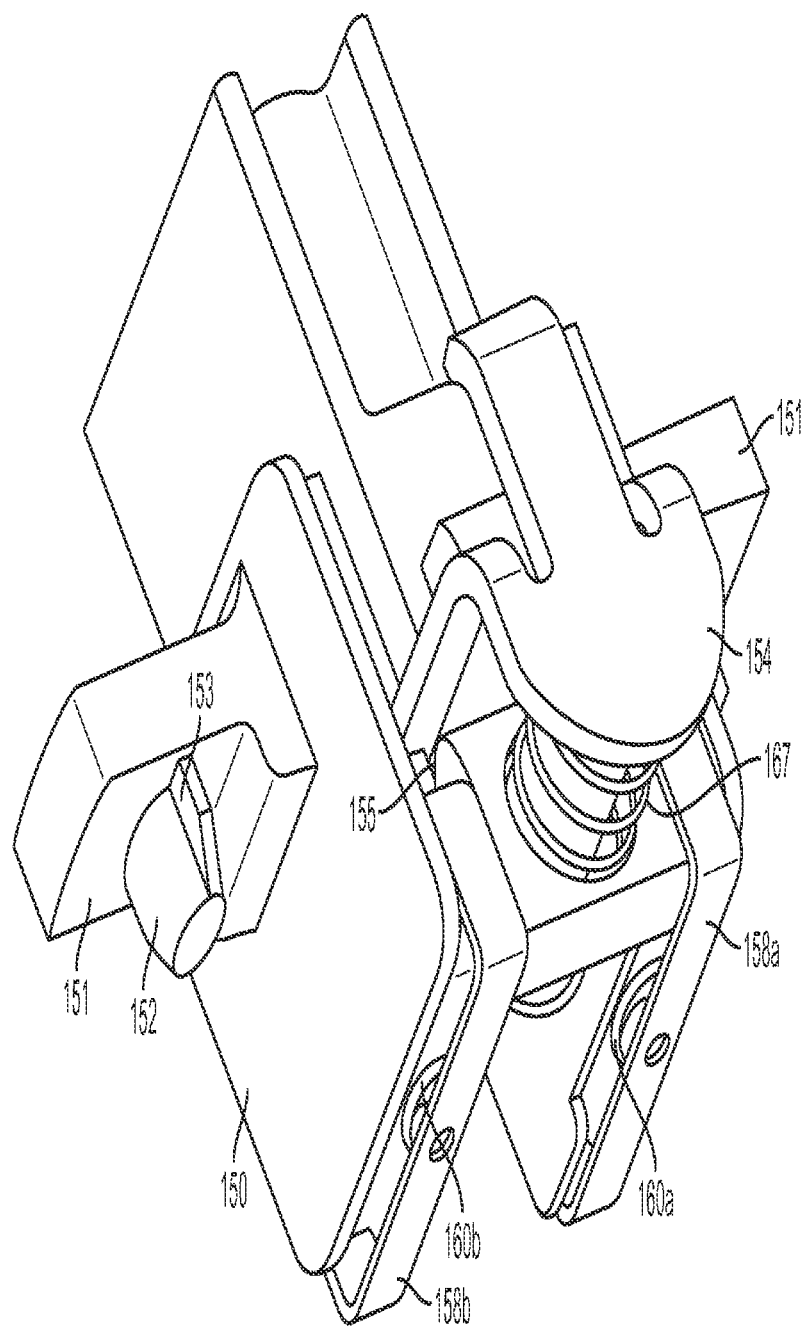
FIG. 5C is a perspective view of an exemplary embodiment of a latch block assembly in accordance with the present invention.

FIG. 5C depicts an alternative embodiment for the latch assembly. Specifically, nonconductive latch block 150 includes two brush arm abutments 151 on opposite sides of the latch block for supporting respective brush arms on a convex upper surface thereof and for retaining a spring element, such as spring elements 57a and 57b shown in FIG. 5B, at one end thereof on retaining members 152, 153. Latch plate 154 slides into and out of a slot through latch block 150. A spring, such as spring 67 shown, for example, in FIG. 6A, biases latch plate out of the slot and a spring, such as spring 62 biases latch plate into the slot.

Conductors 158a and 158b, which are made, for example, of a rigid conducting material such as copper or some other conductive metal, have ends which are retained in grooves 155 in latch block 159 and are flexibly biased away from the bottom surface of latch plate 150 by springs 160a and 160b. When the reset button is pressed, conducting bars 158a and 158b independently connect to reset contacts, such as contacts 33a and 33b shown on FIG. 6A, to activate a trip sequence during a reset operation. According to the exemplary embodiment shown in FIG. 5C, the two rigid conducting bars 158a, 158b, are disposed on opposite sides of the bottom surface of latch block 150. As a result, if the reset button is pressed downward at an angle, as opposed to straight down, electrical connection between the reset contacts, e.g., on the printed circuit board, and at least one of conductors 158a and 158b is assured. That is, if the reset button is pressed down at a steep enough angle, either rigid conductor bar 158a or rigid conducting bar 158b will electrically connect the reset contacts before the other conducting bar connects the contacts. Thereafter, as the reset button is further pressed, spring 160a, and/or spring 160b, will compress and the conducting bar will slide upwards in its respective groove 155, allowing the other conducting bar to connect with the reset contacts. Accordingly, a solid electrical connection between the reset contacts is established.

For example, the sinusoidal AC waveform includes two half-cycles, a positive half-cycle and a negative half-cycle. The so-called firing half-cycle refers to the particular half-cycle, either positive or negative, during which a gate trigger signal to an SCR, for example SCR 359, SCR 360 and/or SCR 320, results in the respective solenoid coil(s) conducting current and the solenoid firing, e.g., where the armature, or plunger, moves. A non-firing half-cycle refers to the alternate half-cycle of the AC waveform, i.e., either negative or positive, where current does not flow through an SCR or its respective solenoid coil, regardless of whether or not the SCR gate is triggered. Whether the positive or negative half-cycle is the firing half-cycle is typically determined by a diode placed in series with the respective solenoid coil, such as diodes 361, 363 and 365.

Under preferred conditions the auto-monitoring routine consistent with embodiments of the invention disclosed herein can be performed at any time within a given AC cycle, that is, during either the positive or negative (firing or non-firing) half-cycle. It is preferable, however, that the auto-monitoring routine be completed entirely during the non-firing half-cycle, so that any unintentional firing of the solenoid, for example, due to inadvertent SCR triggering, is avoided.

According to the present invention, however, it is acceptable, but unpreferable, for the auto-monitoring routine to be performed during the firing half-cycle(s) of the solenoid. The programmable device according to at least one exemplary embodiment of the present invention is able to turn ON the test current, e.g., on independent third conductor 356, sample a voltage level, e.g., at the ADC input of device 301, make a determination whether the routine has passed, and then turn OFF the test current, all within a very short time period. Specifically, the time period necessary to perform the auto-monitoring test is short enough such that even if it were conducted entirely during a firing half-cycle the trigger signal output from SCR would not be long enough to trip the interrupter. For example, the auto-monitoring circuit according to this embodiment, e.g., circuit 370, operates in this condition and as such one auto-monitoring event is completed within 250 microseconds, i.e., the pulsewidth of the test signal placed on conductor 356 during the auto-monitoring event, according to this exemplary embodiment.

According to a further embodiment of a circuit interrupting device consistent with the invention, programmable device 301 monitors the AC power input to the device. For example, the device can monitor the 60 Hz AC input that is electrically connected to the phase and neutral line terminals 326, 328.

A full AC cycle at 60 Hz takes approximately 16.667 milliseconds to complete. Thus, to monitor and confirm receipt and stabilization of the AC waveform, a timer/counter within programmable device 301 is implemented. For example, within a 100 millisecond window there should be at least 6 positive transitions of a 60 Hz signal. However, because AC frequencies may fluctuate at 60 Hz, the qualifying event count, e.g., to determine that AC power has been applied to the device, is set to less than 6 such transitions, for example, 3 positive transitions. Accordingly, the situation is accommodated where a circuit interrupting device in accordance with the invention is connected to a variable power source, such as a portable generator, that exhibits a lower frequency at start-up and requires a stabilization period before the optimal frequency, e.g., 60 Hz, is achieved.

Further, to confirm that the applied AC power waveform has stabilized at the optimal frequency, programmable device 301 counts the number of positive, or negative, transitions repetitively occurring within a given period. For example, for a 60 Hz input waveform the device looks for, i.e., counts, 6 transitions occurring within each 100 millisecond window during a 3 second total timeframe. If the frequency is not stabilized at the optimal frequency, or at least not within an acceptable range, the initiation of the auto-monitoring routine is delayed until the frequency is stabilized. If the frequency does not achieve the optimal frequency, or a frequency within an acceptable range, within a predetermined time, a fail tally is incremented. Similar to the fail tally discussed previously with respect to the auto-monitoring routine, if the tally reaches a given threshold, the programmable device 301 can declare EOL.

As described above, according to at least one exemplary embodiment, programmable device 301 is implemented in a microprocessor. Because some microprocessors include non-volatile memory, e.g., for storing various data, etc., in the event of a power outage, according to a further embodiment all events, timers, tallies and/or states within the non-volatile memory are cleared upon power-up of the device. Accordingly, if the fail tally or other condition resulted from improper device installation, inadequate or improper power, or some other non-fatal condition with respect to the circuit interrupting device itself, the fail tally would be reset on power-up, when the tally incrementing event may no longer be preset. Of course, another way of avoiding this potential issue is to utilize a programmable device that does not have non-volatile memory.

Figure 14A:
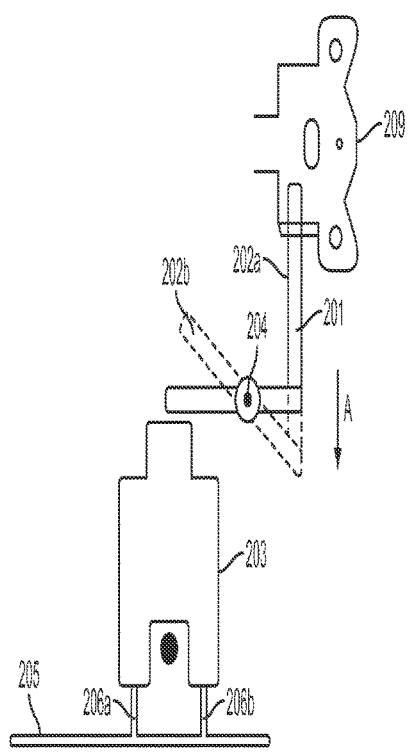
FIGS. 14A-14C are schematic drawings illustrating an alternative embodiment of the present invention.
Figure 14B:
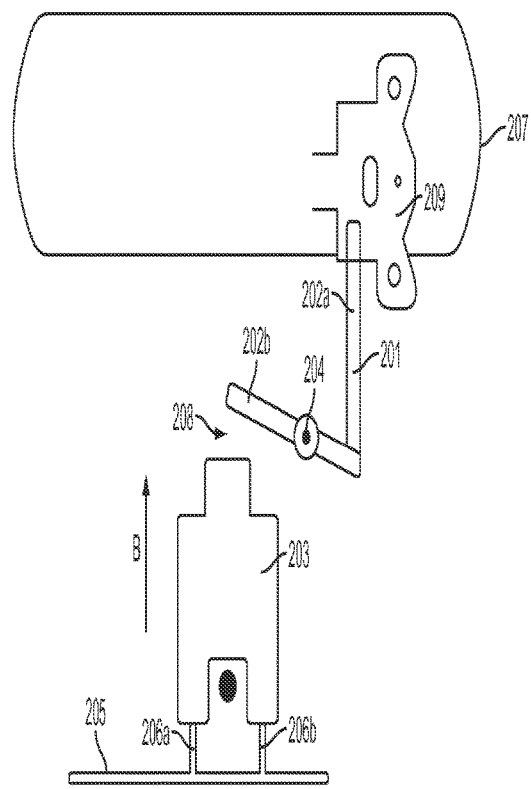
Figure 14C:
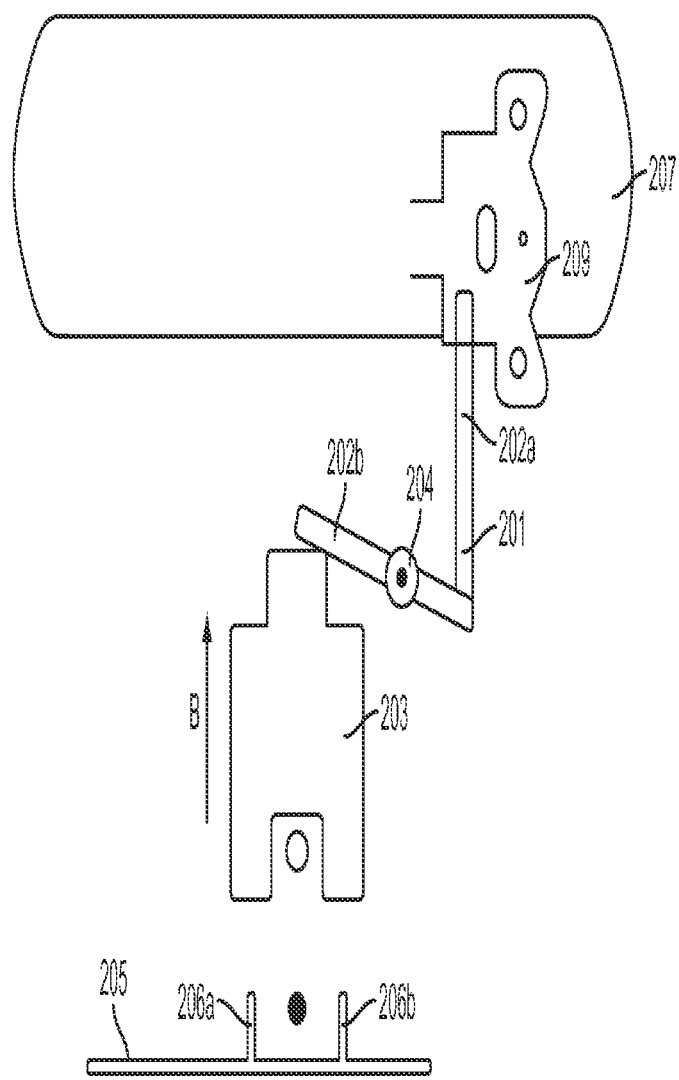

According to an alternative embodiment illustrated in FIGS. 14A-14C, an exemplary GFCI device is initially prevented from entering the reset state until a mechanical lock is released. The mechanical lock in the illustrated embodiment is secured in the locked position until the GFCI device is installed. The GFCI device then enters the reset state only if the GFCI device is properly wired. If the GFCI device is subsequently uninstalled, the lock mechanism will return to the locked state. If the GFCI device is ever re-installed, the exemplary GFCI device will still only enter the reset state if the device is properly wired.

Referring to FIGS. 14A-14C, a spring biased pivoting arm or probe 201 is provided as a locking mechanism. FIG. 14A shows probe 201 (solid line) in the locked position prior to installation of the GFCI device. Probe 201 locks the miswire plate 203 to the printed circuit board (PCB) 205 to prevent the miswire plate 203 from disengaging from the PCB 205 prior to installation of the GFCI device. Miswire plate 203, including its structure and operation relative to a GFCI device according to this exemplary embodiment is described in detail in U.S. Pat. No. 7,184,250, which issued on Feb. 27, 2007, the entire contents of which are incorporated herein by reference. Specifically, miswire plate 203 corresponds to locking plate 58 disclosed in U.S. Pat. No. 7,184,250. Probe 201 preferably secures the miswire plate 203 from disengaging from the PCB 205 under excess vibration or shock, for example, as may occur if the GFCI device is dropped or struck. The electrical connection between the miswire plate 203 and contacts 206a, 206b on PCB 205, electrically shorts a conducting path provided in parallel with a silicon controlled rectifier (SCR) that initiates a reset of the GFCI device. Only when the miswire plate 203 is disengaged from the PCB 205 will the SCR operate in a conducting state to reset the GFCI device.

To disengage the miswire plate 203 from contacts 206a, 206b on PCB 205, the probe 201 must be placed in the unlocked position. As shown in FIG. 14B, when a cover plate or wallplate 207 is pressed against a bridge or mounting strap 209, for example, as would occur during device installation, wallplate 207 presses down on a first arm 202a of the probe 201. As the first arm 202a is pressed down in the direction of arrow "A" in FIG. 14A, a second arm 202b pivots away from the miswire plate 203 as shown in dotted line in FIG. 14A. The second arm 202b previously held miswire plate 203 in contact with the PCB e.g., against the bias of a spring element. Thus, as the second arm 202b pivots away from the miswire plate on pivot 204, a space 208 is provided for miswire plate 203 to move away from contacting the PCB 205, for example, in the direction of arrow "B" in FIGS. 14B, 14C. If the GFCI is properly wired by providing AC power to the line terminals, the miswire plate moves out of contact with PCB 205, thus, opening the shorting path of the SCR, until miswire plate 203 contacts the second arm 202b of the probe 201, as shown in FIG. 14C. Once the shorting path of the SCR is opened, the SCR can enter a conducting state to initiate the reset of the GFCI device. If the GFCI device is re-installed, the spring biased second arm 202b will pivot back to the locked position shown in FIG. 14A, and force the miswire plate 203 back into engagement with contacts 206a and 206b on PCB 205.

While the present invention has been shown and described with reference to particular illustrative embodiments, it is not to be restricted by the exemplary embodiments but only by the appended claims and their equivalent. It is to be appreciated that those skilled in the art can change or modify the exemplary embodiments without departing from and the scope and spirit of the present invention.

What is claimed is:

1. A circuit interrupting device comprising:
    a hot line terminal and a neutral line terminal for electrically connecting to an AC power source;
    a hot load terminal and a neutral load terminal for electrically connecting to an electrical load;
    a first electrical conductor disposed between the hot line terminal and the hot load terminal;
    a second electrical conductor disposed between the neutral line terminal and the neutral load terminal;
    a fault detecting circuit operable to detect at least one type of fault and generate a fault detection signal when said fault is detected;
    an interrupter electrically connected to said first and second conductors and said hot and neutral load terminals and being operable to electrically disconnect one or more of said hot line terminal from said hot load terminal and said neutral line terminal from said neutral load terminal when actuated;
    a first switching device electrically coupled to said fault detecting circuit and closing when said fault detection signal is received from said fault detecting circuit;
    a second switching device electrically coupled to an output of said first switching device and closing as a result of said first switching device closing; and
    a third switching device electrically coupled to an output of said first switching device and closing as a result of said first switching device closing, wherein said interrupter is actuated when only one of said second and third switching devices is closed and when both of said second and third switching devices is closed.

2. The circuit interrupting device recited in claim 1, further comprising a dual coil solenoid having first and second coils, said first coil being electrically connected between said hot line terminal and an input to said second switching device and said second coil being electrically connected between said hot line terminal and an input to said third switching device.

3. The circuit interrupting device recited in claim 1, further comprising a fourth switching device electrically coupled between said fault detecting circuit and an input to said first switching device, wherein said first switching device closes as a result of said fourth switching device closing.

4. The circuit interrupting device recited in claim 3, wherein said fourth switching device is coupled to a reset button disposed on an outer surface of said circuit interrupting device, said fourth switching device closing when said reset button is pressed.

5. The circuit interrupting device recited in claim 1, further comprising a self-test circuit having a processing device and a transistor, said processing device periodically controlling said transistor to turn on during a self-test operation and draw current through a third conductor separate from said first and second electrical conductors, wherein said fault detecting circuit detects said current in said third conductor and generates said fault detection signal.

6. The circuit interrupting device recited in claim 1, further comprising, a latch assembly having a latch block and a latch plate disposed in a slot in said latch block, said latch block movable on a first axis in a first direction and a second direction opposite said first direction, and said latch plate movable on a second axis substantially perpendicular to said first axis in said first and second directions simultaneously with said latch block and also movable in a third direction substantially perpendicular to said first and second directions and a fourth direction opposite said third direction.

7. The circuit interrupting device recited in claim 6, further comprising a reset assembly having a reset button and a reset pin coupled to said reset button, said reset pin including an annular reset flange having a top surface and a bottom surface, wherein said latch plate and said latch block are moved in said first direction when said bottom surface contacts said latch plate and said latch plate and said latch block are moved in said second direction when said top surface contacts said latch plate.

8. The circuit interrupting device recited in claim 7, further comprising a first rigid conductive bar disposed at a bottom surface of said latch block and a reset switch having a first contact electrically coupled to said fault detecting circuit and a second contact electrically coupled to said first switching device, wherein said rigid conductive bar electrically connects said first and second contacts when said reset button is pressed.

9. The circuit interrupting device recited in claim 8, further comprising a second rigid conductive bar disposed at the bottom surface of said latch block, a first reset switch spring disposed between the bottom surface of said latch block and said first rigid conductive bar and a second reset switch spring disposed between the bottom surface of said latch block and said second rigid conductive bar, wherein one or more of said first rigid conductive bar and said second rigid conductive bar are operable to electrically connect said first and second contacts when said reset button is pressed.

10. The circuit interrupting device recited in claim 8, wherein said latch block includes first and second latch block arms disposed on opposite sides of said latch block, said latch block arms each having a convex upper surface and a lower surface with a retaining peg protruding therefrom.

11. The circuit interrupting device recited in claim 8, further comprising a latch plate spring element disposed between said latch block and an inner surface of said latch plate, said latch plate spring element resiliently maintaining said latch plate in a first position where said reset flange contacts said latch plate when said reset button is pressed.

12. The circuit interrupting device recited in claim 5, wherein said processing device determines whether said fault detecting circuit successfully generated said fault detection signal as a result of said self-test operation and sets an end-of-life flag if said fault detecting circuit did not successfully generate said fault detection signal as a result of said self-test operation.

13. The circuit interrupting device recited in claim 12, further comprising an optocoupler device coupled to said hot load terminal and said neutral load terminal and turning on when said hot and neutral load terminals are receiving power from said hot and neutral line terminals, wherein said processing device determines whether the interrupter is open or closed based on a voltage level generated by said optocoupler device.

14. The circuit interrupting device recited in claim 13, wherein, if said end-of-life flag is set and said processing device determines that said interrupter is closed, said processing device periodically outputs a control signal for closing one or more of said second and third switching devices until said processing device determines that said interrupter is open.

15. The circuit interrupting device recited in claim 5, wherein said processing device generates an end-of-life indicator signal to actuate an end-of-life indicator circuit when said end-of-life indicator flag is set, said end-of-life indicator circuit including one or more of an indicator light and an audible indicating device.

16. The circuit interrupting device recited in claim 15, wherein said processing device continuously actuates said end-of-life indicator circuit if said fault detecting circuit fails said self-test operation a predetermined number of times within a predetermined amount of time.

17. The circuit interrupting device recited in claim 16, wherein said processing device continuously actuates said end-of-life indicator circuit if said fault detecting circuit fails said self-test operation more than six times within a one minute time period.

18. A circuit interrupting device comprising:
a housing having a front cover and a rear cover;
a hot line terminal and a neutral line terminal for electrically connecting to an AC power source;
a hot load terminal and a neutral load terminal for electrically connecting to an electrical load;
a first electrical conductor disposed between said hot line terminal and said hot load terminal;
a second electrical conductor disposed between said neutral line terminal and said neutral load terminal;
a detecting circuit operable to detect a magnetic flux and generate a detection signal when said flux is detected;
an interrupter electrically connected to said first and second conductors and said hot and neutral load terminals and operable to electrically disconnect one or more of said hot load terminal from said hot line terminal and said neutral load terminal from said neutral line terminal when actuated;
a first switching device closing when fault detection signal is received;
a second switching device closing as a result of said first switching device closing;

a third switching device electrically coupled to an output of said first switching device and closing as a result of said first switching device closing, wherein said interrupter is actuated when only one of said second and third switching devices is closed and when both of said second and third switching devices is closed; and an auto-monitoring circuit electrically coupled to said detecting circuit and operable to generate a test magnetic flux to be detected by said detecting circuit, wherein said rear cover of said housing includes a recessed receptacle in which said hot line terminal and said neutral line terminal are disposed, said recessed receptacle being configured to receive a power plug connected to AC power.

19. The circuit interrupting device recited in claim 18, wherein said first switching device is electrically coupled to said detecting circuit and is controlled to conduct electric current when said detection signal is received from said detecting circuit and said second switching device is electrically coupled to an output of said first switching device and conducts electric current as a result of said first switching device conducting electric current, and said third switching device is electrically coupled to an output of said first switching device and conducts electric current as a result of said first switching device conducting electric current.

* * * * *